US009951754B2

(12) United States Patent
Johnson et al.

(10) Patent No.: US 9,951,754 B2
(45) Date of Patent: Apr. 24, 2018

(54) SYSTEM AND METHOD FOR ASSEMBLING TOWER SECTIONS OF A WIND TURBINE LATTICE TOWER STRUCTURE

(71) Applicant: General Electric Company, Schenectady, NY (US)

(72) Inventors: Don Conrad Johnson, Simpsonville, SC (US); Cyler Barclay Beard, Scotia, NY (US); Todd D. Andersen, Heber City, UT (US); David D. Oliphant, West Jordan, UT (US); Caroline Christine Williams, Pensacola, FL (US); Jose Luis Virgen, Lancaster, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 390 days.

(21) Appl. No.: 14/751,214

(22) Filed: Jun. 26, 2015

(65) Prior Publication Data
US 2017/0009747 A1    Jan. 12, 2017

(51) Int. Cl.
*F03D 13/10* (2016.01)
*F03D 13/20* (2016.01)

(52) U.S. Cl.
CPC ............ *F03D 13/20* (2016.05); *F03D 13/10* (2016.05); *F05B 2220/30* (2013.01); *F05B 2230/60* (2013.01); *F05B 2230/61* (2013.01); *F05B 2240/9121* (2013.01); *Y02E 10/728* (2013.01); *Y02P 70/523* (2015.11)

(58) Field of Classification Search
CPC ......... B66C 1/108; F03D 13/20; F03D 13/10; F03D 13/00; F05B 2230/61; F05B 2240/9121; F05B 2220/30; F05B 2230/60; E04H 12/34; Y10T 29/49616; Y10T 29/49623; Y10T 29/49625; Y10T 29/49627

USPC .......................................... 52/745.17, 745.18
See application file for complete search history.

(56) References Cited

U.S. PATENT DOCUMENTS

| | | | |
|---|---|---|---|
| 6,625,866 B2 * | 9/2003 | Stone | B21J 15/14 269/21 |
| 2011/0283640 A1 * | 11/2011 | Miller | E02D 27/42 52/292 |

FOREIGN PATENT DOCUMENTS

| | | |
|---|---|---|
| CA | 2823814 A1 | 2/2015 |
| FR | 40043 E | 3/1932 |
| JP | 2003239567 A | 8/2003 |

(Continued)

OTHER PUBLICATIONS

European Search Report and Opinion issued in connection with corresponding EP Application No. 16176179.6 dated Nov. 8, 2016.

(Continued)

*Primary Examiner* — Jason L Vaughan
*Assistant Examiner* — Amanda Meneghini
(74) *Attorney, Agent, or Firm* — Dority & Manning, P.A.

(57) ABSTRACT

In one aspect, a method for assembling a tower section of a lattice tower structure for a wind turbine on a tower assembly fixture may generally include installing a first trolley onto a first fixture arm of the fixture and installing a second trolley onto a second fixture arm of the fixture. In addition, the method may include securing a first support leg of the tower section to the first trolley, securing a second support leg of the tower section to the second trolley and coupling at least one secondary support member between the first and seconds support legs.

19 Claims, 23 Drawing Sheets

(56) References Cited

FOREIGN PATENT DOCUMENTS

WO          2010061048 A1    6/2010
WO   WO 2010061048 A1 *  6/2010  ............. E04H 12/34

OTHER PUBLICATIONS

Statkraft—YouTube Video Building of Stamasen Wind Farm in Sweden. Published Oct. 16, 2012. https://www.youtube.com/watch?v=e5V8wFwwrDA.
Statkraft—YouTube Video Stamasen 5 min eng ver 1 1 640 PX / Statkraft SCA Vind AB bygger Stamasens Vindpark. Published Jan. 17, 2013. https://www.youtube.com/watch?v=-BAi4ZsIQz8.

* cited by examiner

SYSTEM AND METHOD FOR ASSEMBLING TOWER SECTIONS OF A WIND TURBINE LATTICE TOWER STRUCTURE

FIELD OF THE INVENTION

The present subject matter relates generally to assembling wind turbine towers and, more particularly, to a system and method for assembling tower components to form a lattice or "space frame" tower structure for a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy. A power converter typically regulates the flow of electrical power between the generator and a grid.

Wind turbine towers typically have a tubular pole or lattice structure configuration. Conventionally, the tubular pole configuration has been much easier to assemble than the lattice structure. However, tubular poles require the use of significantly more materials than lattice tower structures, thereby making the use of such towers quite expensive. Thus, it is often desirable to utilize lattice structures for supporting a wind turbine. Unfortunately, due to the number of components included within a lattice tower structure and the numerous joints that must be formed between the adjacent tower components, the assembly of a lattice tower structure is often quite complex and time consuming.

Accordingly, an improved system and method for assembling wind turbine tower components for use within an open, lattice tower structure would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for assembling a tower section of a lattice tower structure for a wind turbine on a tower assembly fixture, wherein the tower assembly fixture includes a plurality of radially extending fixture arms. The method may generally include installing a first trolley onto a first fixture arm of the plurality of radially extending fixture arms, wherein the first trolley includes a first base frame configured to be coupled to the first fixture arm and a first leg mount coupled to the first base frame. The method may also include installing a second trolley onto a second fixture arm of the plurality of radially extending fixture arms, wherein the second trolley includes a second base frame configured to be coupled to the second fixture arm and a second leg mount coupled to the second base frame. In addition, the method may include securing a first support leg of the tower section to the first leg mount, securing a second support leg of the tower section to the second leg mount and coupling at least one secondary support member between the first and seconds support legs.

In another aspect, the present subject matter is directed to a method for assembling tower sections of a lattice tower structure for a wind turbine on a tower assembly fixture, wherein the tower assembly fixture includes a plurality of radially extending fixture arms. The method may generally include installing a plurality of trolleys onto the tower assembly fixture, wherein each trolley is installed onto a respective one of the plurality of radially extending fixture arms and each trolley includes a base frame configured to be coupled to its respective fixture arm and a leg mount coupled to the base frame. In addition, the method may include securing each of a plurality of support legs of a tower section of the lattice tower structure to a respective one of the plurality of trolleys and coupling at least one secondary support member between each pair of adjacent support legs to form the tower section.

In a further aspect, the present subject matter is directed to a method for assembling tower sections of a lattice tower structure for a wind turbine. The method may generally include coupling a plurality of radially extending fixture arms to one another to form a tower assembly fixture having a central framed portion, wherein each fixture arm extends radially between a first end disposed at the central framed portion and a second end positioned radially outwardly from the central framed portion. In addition, the method may include installing a plurality of trolleys onto the tower assembly fixture, wherein each trolley is installed onto a respective one of the plurality of radially extending fixture arms at a radial location defined between the first and second ends of each respective fixture arm. In addition, each trolley may include a base frame configured to be coupled to its respective fixture arm and a leg mount coupled to the base frame.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
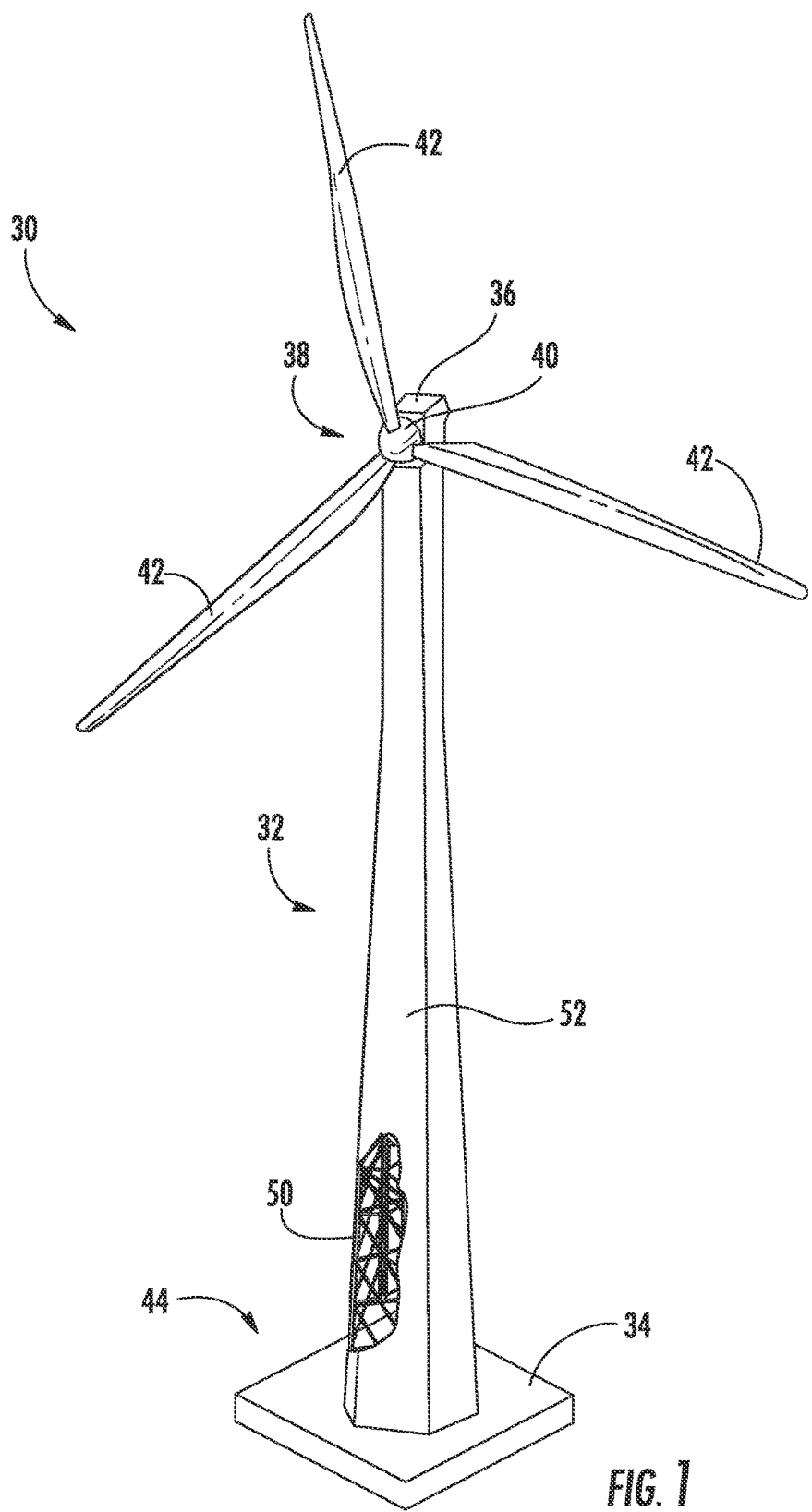
FIG. 1 illustrates a perspective view of one embodiment of a wind turbine in accordance with aspects of the present subject matter, particularly illustrating the wind turbine including a lattice tower structure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved system and method for assembling tower sections of a lattice tower structure for a wind turbine. In several embodiments, the system may include a tower assembly fixture and a plurality of trolleys configured to be installed onto the fixture. As will be described below, the fixture may include a plurality of radially extending fixture arms, with each fixture arm being configured to have at least one trolley installed thereon. In a particular embodiment, each trolley may include a base frame configured to be coupled to its corresponding fixture arm and a leg mount configured to be coupled to a support leg of the tower section being assembled on the fixture. The various support legs of the tower section may be coupled to the leg mounts of the trolleys such that each support leg is supported above the fixture at a substantially vertical orientation so as to allow one or more secondary support members of the tower structure (e.g., circumferential spacers and/or cross-bracing members) to be installed between each pair of adjacent support legs in order to complete the assembly of the tower section.

As will be described below, in several embodiments, each trolley may be configured to be removably coupled to its respective fixture arm such that the trolley may be installed at a plurality of different radial locations along the fixture arm. Such adjustment of the radial position of each trolley may allow for tower sections having differing radial dimensions to be assembled on the tower assembly fixture. Moreover, in one embodiment, the leg mount of each trolley may be pivotally coupled to its corresponding base frame. Such a pivotal connection may allow the angular orientation of the leg mount to be adjusted, thereby providing a means for supporting the support legs at plurality of different substantially vertical orientations.

Referring now to the drawings, FIG. 1 illustrates a perspective view of one embodiment of a wind turbine 30. As shown, the wind turbine 30 generally includes a tower 32 extending from a tower support surface or foundation 34 (e.g., the ground, a concrete pad or any other suitable support surface). In addition, the wind turbine 30 may also include a nacelle 36 mounted on the tower 32 and a rotor 38 coupled to the nacelle 36. The rotor 38 includes a rotatable hub 40 and at least one rotor blade 42 coupled to and extending outwardly from the hub 40. For example, in the illustrated embodiment, the rotor 38 includes three rotor blades 42. However, in an alternative embodiment, the rotor 38 may include more or less than three rotor blades 42. Each rotor blade 42 may be spaced about the hub 40 to facilitate rotating the rotor 38 to enable kinetic energy to be transferred from the wind into usable mechanical energy, and subsequently, electrical energy. For instance, the hub 40 may be rotatably coupled to an electric generator (not shown) positioned within the nacelle 36 to permit electrical energy to be produced.

In several embodiments, the tower 32 may include a plurality of structural members (e.g., vertical, horizontal and/or diagonally extending structural members) coupled to one another so as to form an open lattice tower structure 50. Such lattice tower structures 50 are also referred to in the art as "space fame" towers. In addition, the tower 32 may also include a cladding material 52 installed onto the lattice tower structure 50 so as to completely or substantially completely cover the open structure. The cladding material 52 may generally correspond to any suitable material, including various metal materials and/or fabrics (e.g., PVC-coated fabrics and/or PTFE-coated fabrics). As is generally understood, the cladding material 52 may, in one embodiment, be formed in sheets, with each sheet being configured to be installed onto or over specific portions of the lattice structure 50. For instance, when the cladding material 52 corresponds to a fabric, the sheet of cladding material 52 may be configured to be unrolled onto or over a portion of a specific vertical section of the lattice structure 50.

Figure 2:
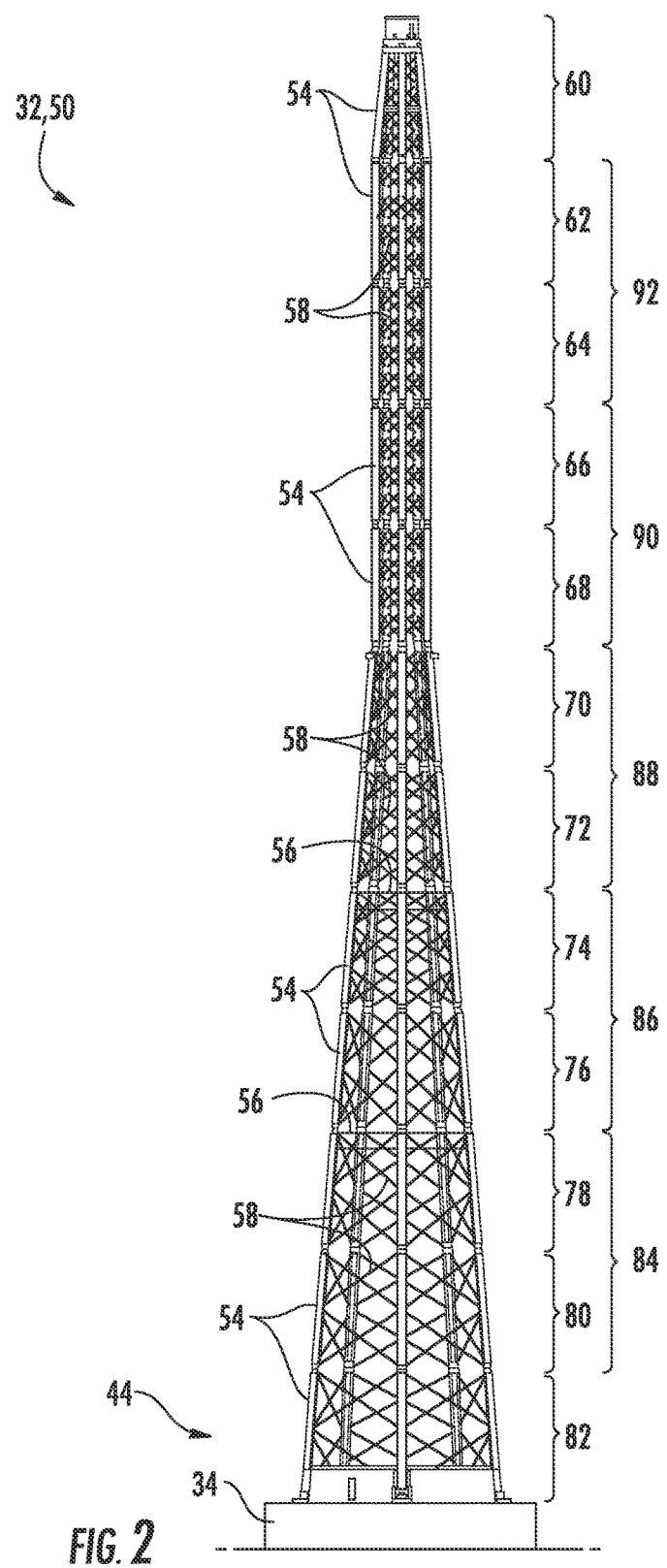
FIG. 2 illustrates a side view of the lattice tower structure of the wind turbine shown in FIG. 1, particularly illustrating the cladding of the wind turbine removed from the lattice tower structure.

Referring now to FIG. 2, a side view of the tower 32 shown in FIG. 1 is illustrated in accordance with aspects of the present subject matter, particularly illustrating the lattice tower structure 50 with the cladding material 52 completely removed therefrom. As indicated above, the lattice tower structure 50 may include a plurality of structural members configured to be coupled to one another so as to form the open, "space frame" arrangement. For example, the lattice tower structure 50 may include a plurality of substantially vertically oriented support members 54 (hereinafter referred to as "support legs" or simply "legs") coupled one on top of the other so as to form the overall vertical shape or profile of the tower structure 50. In addition, the lattice tower structure 50 may include a plurality of secondary support members 56, 58 coupled between the support legs 54, such as a plurality of horizontally oriented support members 56 (e.g., circumferential spacers and/or cladding brackets) and/or a plurality of diagonally orientated support members 58 (e.g., cross-bracing members).

In several embodiments, the lattice tower structure 50 may be formed by stacking a plurality of vertical tower sections one on top of the other. For instance, in the illustrated embodiment, the lattice tower structure 50 includes twelve vertical tower sections, namely a first (or top) tower section 60, a second tower section 62, a third tower section 64, a fourth tower section 66, a fifth tower section 68, a sixth tower section 70, a seventh tower section 72, an eighth tower section 74, a ninth tower section 76, a tenth tower section 78, an eleventh tower section 80 and a twelfth (or bottom) tower section 82, stacked one on top of the other. Each vertical tower section may include its own set of support legs 54 and corresponding secondary support members 56, 58 coupled between the legs 54, with the support legs 54 of each tower section being coupled end-to-end with the support legs 54 of adjacent tower sections. As will be described below, one or more of the tower sections may be assembled individually and/or in combination with one or more other tower sections (e.g., to form a vertical stack of tower sections) using a tower assembly fixture 102 (FIGS. 4 and 5) located separate from a final tower location 44 of the wind turbine tower 32 (i.e., the location of the tower foundation 34). The individual tower section(s) (or the stacked tower sections) may then be moved to the final tower location 44 and stacked together to form the complete lattice tower structure 50.

For instance, in a particular embodiment of the present subject matter, the tower sections (less the top and bottom tower sections 60, 82) may be assembled into separate vertical stacks, with each vertical stack including two adjacent tower sections. Specifically, as shown in FIG. 2, the tower sections may be assembled into five separate vertical stacks, namely a first vertical stack 84 including the tenth and eleventh tower sections 78, 80, a second vertical stack 86 including the eighth and the ninth tower sections 74, 76, a third vertical stack 88 including the sixth and seventh tower sections 70, 72, a fourth vertical stack 90 including the fourth and fifth tower sections 66, 68 and a fifth vertical stack 92 including the second and third tower section 62, 64. In such an embodiment, the various vertical stacks may be assembled at a separate location and subsequently stacked or installed one on top of the other above the bottom tower section 82 in a sequential manner. Thereafter, the top tower section 60 may the installed on top of the fifth vertical stack 92 (e.g., on top of the second tower section 72) to form the complete lattice tower structure 50.

It should be appreciated that, although the lattice tower structure 50 is shown in the illustrated embodiment as including twelve tower sections, the lattice structure 50 may generally include any suitable number of tower sections. For instance, in alternative embodiments, the lattice structure 50 may include less than twelve tower sections or greater than twelve tower sections.

It should also be appreciated that, as described herein, the various support legs 54 included within each tower section may be configured to be assembled within the lattice tower stricture 50 so as to have a substantially vertical orientation. As used herein, the term "substantially vertical orientation" generally refers to a completely vertical orientation plus or minus an angular tolerance generally corresponding to the maximum taper angle of the lattice tower structure 50 being assembled. For instance, in one embodiment, the term "substantially vertical orientation" may correspond to a completely vertical orientation plus or minus an angular tolerance of less than about 20 degrees, such as an angular tolerance of less than about 15 degrees or less than about 10 degrees. For example, as shown in the illustrated embodiment, the support legs 54 included within the bottom, eleventh, tenth, ninth, eighth, seventh and sixth tower sections 82, 80, 78, 76, 74, 72, 70 are orientated relative to vertical at about a five degree angle so as to form the tapered lower section of the lattice tower structure 50 whereas the fifth, fourth, third and second tower sections 68, 66, 64, 62 include support legs 54 oriented orientated relative to vertical at about a zero degree angle so as to form the non-tapered upper section of the lattice tower structure 50. In addition, the support legs 54 included within the top tower section 60 are orientated relative to vertical at about a five degree angle so as to form the top tapered section of the lattice tower structure 60. In such an embodiment, each of the support legs 54 shown in FIG. 2 may be considered to have a substantially vertical orientation as assembled within the lattice tower structure 50.

Figure 3:
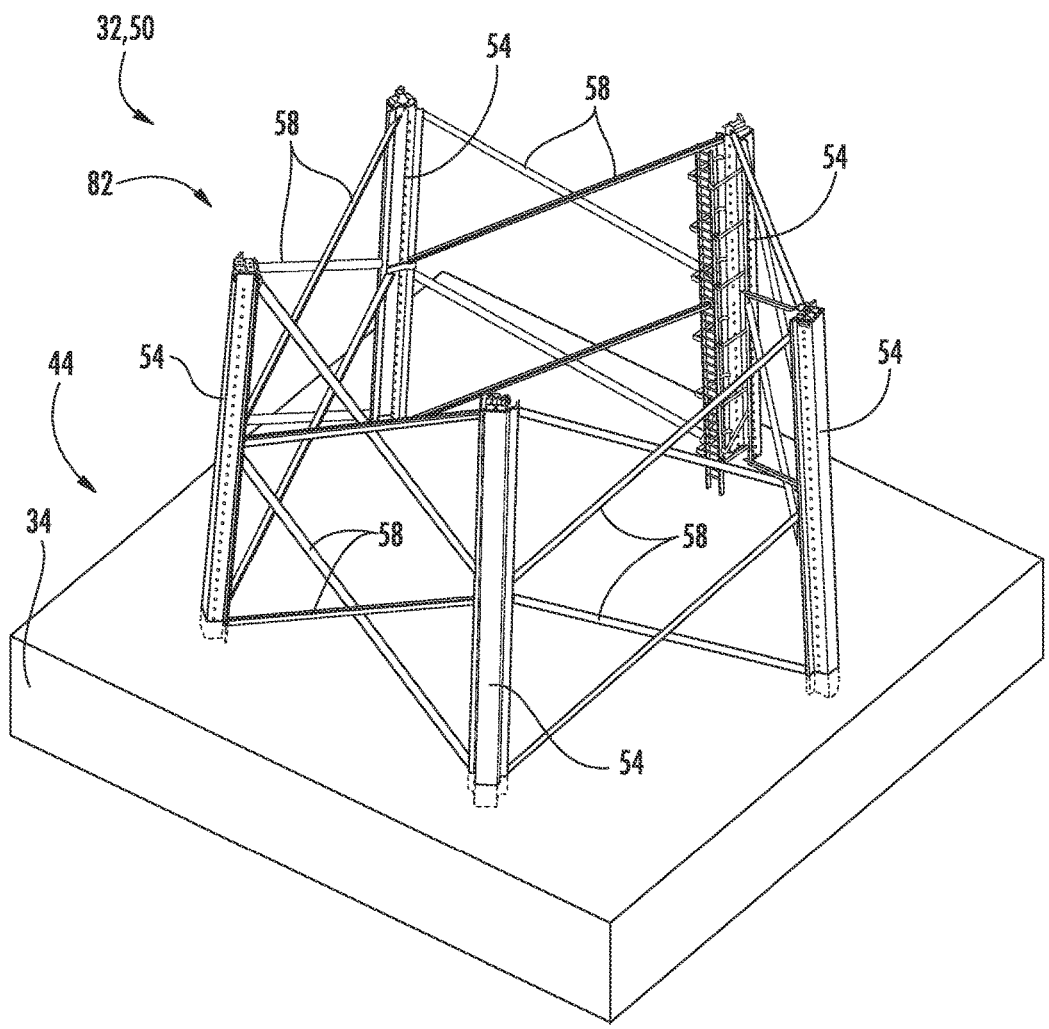
FIG. 3 illustrates a perspective view of a bottom tower section of the lattice tower structure shown in FIG. 2 installed relative to the foundation of the wind turbine.

Referring now to FIG. 3, a perspective view of the bottom tower section 82 of the lattice tower structure 50 as installed at the final tower location 44 is illustrated in accordance with aspects of the present subject matter. As shown, the bottom tower section 82 may be configured to be assembled onto and/or installed directly within the tower foundation 34. For instance, each support leg 54 of the bottom tower section 82 may be initially sunk down into or otherwise coupled to the tower foundation 34 so as to have a substantially vertical orientation, with one or more circumferential spacers (not shown) being coupled between adjacent support legs 54 to ensure proper spacing and/or orientation of the legs 54 relative to one another. Thereafter, any other suitable secondary support members of the bottom tower section 82 may be coupled between the support legs 54. For instance, as shown in FIG. 3, a plurality of cross-bracing members 58 may be coupled between adjacent support legs 54 to provide increased stiffness and structural support to the bottom tower section 82 of the lattice tower structure 50.

Once the bottom tower section 82 is installed at the final tower location 44, the remaining tower sections may then be stacked on top of the bottom tower section 82 to fully assemble the tower structure 50. Specifically, as indicated above, the remaining tower sections may be assembled at a separate location (either individually or in combination with one or more other tower sections) and subsequently lifted into position on top of the bottom tower section 82 (e.g., via a crane). For instance, referring to the embodiment of the lattice tower structure 50 shown in FIG. 2, the tenth and eleventh tower sections 78, 80 may be assembled one on top of the other at a separate location to form the first vertical stack 84. As will be described below with reference to FIG. 22, such vertical stack 84 may then be lifted via a crane 94 and placed directly on top of the bottom tower section 82 to allow the bottom tower section 82 to be coupled directly to the eleventh tower section 80.

In accordance with aspects of the present subject matter, various embodiments, components and features of a system 100 (and related methods) for assembling one or more tower sections of a lattice tower structure for a wind turbine will now be described with reference to FIGS. 4-24. Specifically, as will be described below, the system 100 (and related methods) may allow for vertical tower sections of a lattice tower structure 50 to be assembled onto a tower assembly fixture positioned at a location separate from the final tower location 44 and subsequently stacked one on top of the other at the final tower location 44 to form the tower structure 50. It is believed that such a system 100 (and related methods) may allow for a lattice tower structure 50 to be erected in more safe, efficient and/or effective manner than is currently provided with conventional systems (and related methods) for assembling wind turbine tower components.

Figure 4:
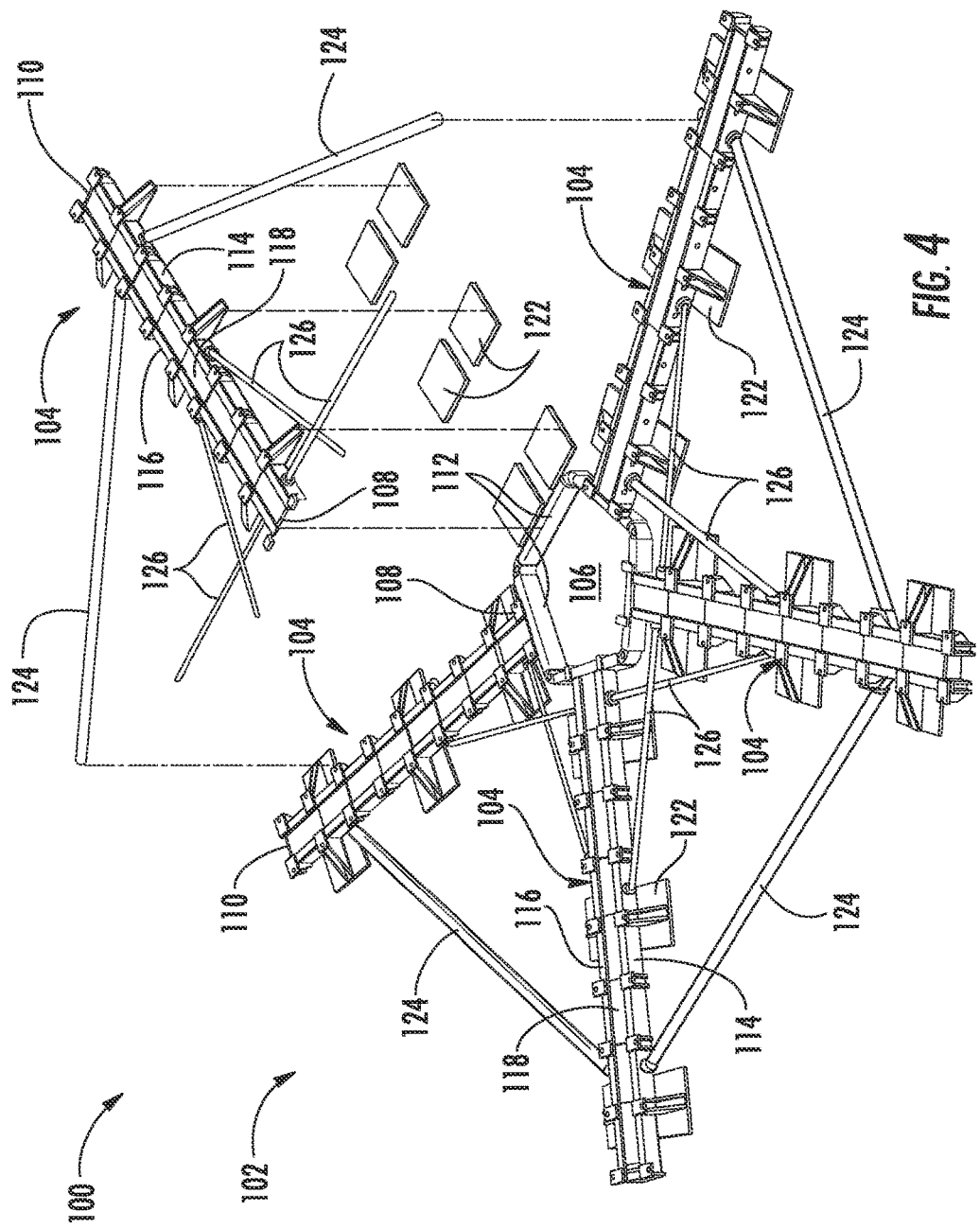
FIG. 4 illustrates a perspective view of one embodiment of a tower assembly fixture for assembling a tower section(s) of the lattice tower structure shown in FIG. 2, particularly illustrating various components of the fixture being exploded away.
Figure 5:
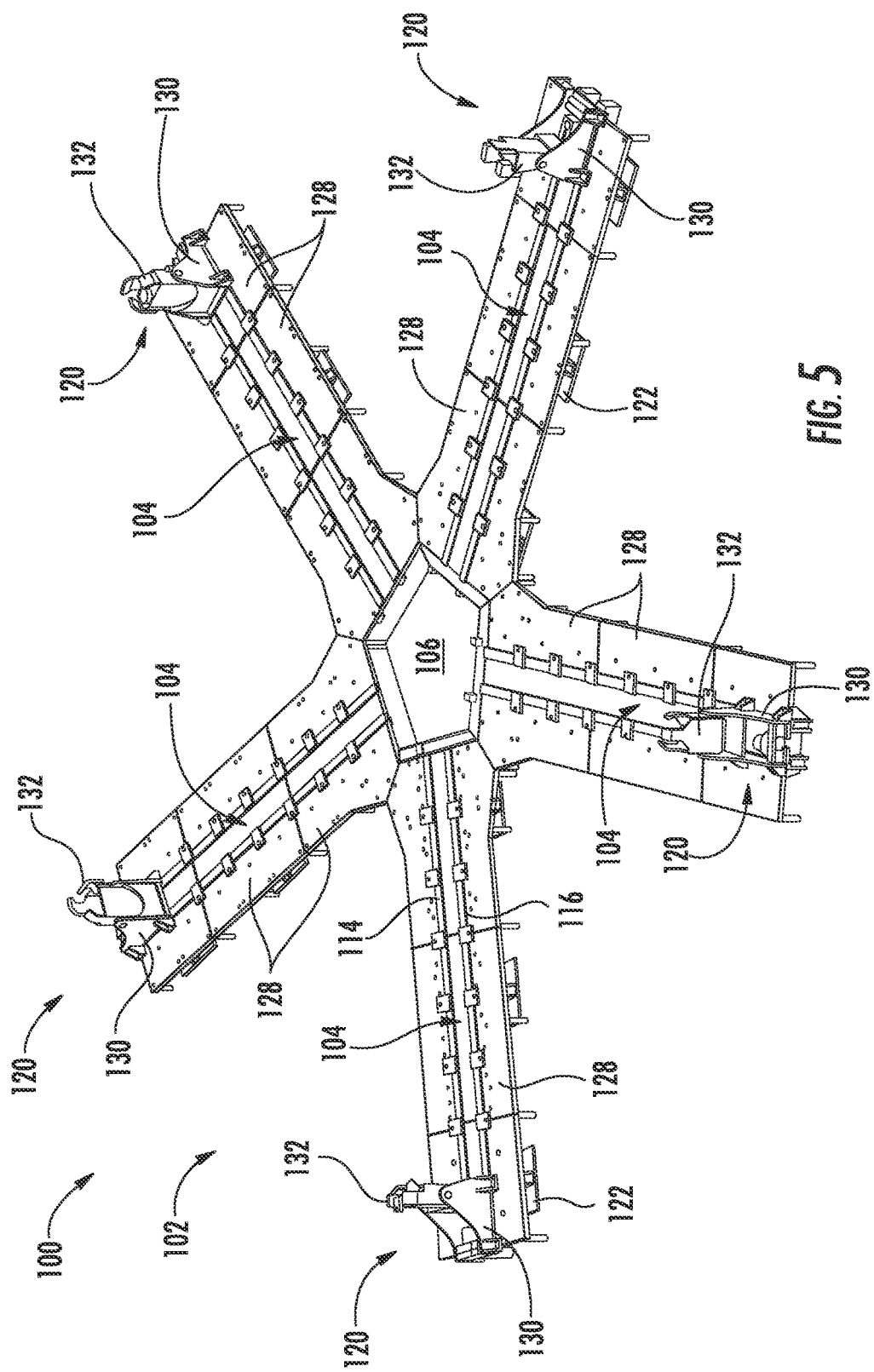
FIG. 5 illustrates a perspective view of the tower assembly fixture shown in FIG. 4 as assembled, particularly illustrating a plurality of trolleys installed onto the fixture.

Referring specifically to FIGS. 4 and 5, differing views of one embodiment a tower assembly fixture 102 that may be utilized in connection with the disclosed system 100 for assembling tower sections of a lattice tower structure 50 are illustrated in accordance with aspects of the present subject matter. Specifically, FIG. 4 illustrates a perspective view of the fixture 102, with various components of the fixture 102 being exploded therefrom. In addition, FIG. 5 illustrates another perspective view of the fixture 102, with additional system components being installed thereon.

As shown, the tower assembly fixture 102 may generally include a plurality of fixture arms 104 extending radially outwardly from a central framed portion 106. In general, each fixture arm 104 may be configured to extend radially between a first end 108 terminating at the central framed portion 106 and an opposite second end 110 positioned radially outwardly from the first end 108. In several embodiments, the first end 108 of each fixture arm 104 may be configured to be coupled to the first ends 108 of adjacent fixture arms 104 so as to define the central framed portion 106 of the fixture 102. For example, as shown in FIG. 4, each fixture arm 104 may include a circumferentially extending frame member 112 (e.g., a beam) positioned at its first end 108. By coupling the frame members 112 of adjacent fixture arms 104 end-to-end, the assembled frame members 112 may form a frame-like structure that defines the central framed portion 106 of the fixture 102. In one embodiment, the frame members 112 may be configured to be pivotally coupled to one another (e.g., via a pinned connection) to allow the circumferential spacing between the fixture arms 104 to be adjusted when coupling the arms 104 to one another.

Additionally, each fixture arm 104 may include one or more support beams 114, 116 extending radially between its first and second ends 108, 110. For instance, as shown in the illustrated embodiment, each fixture arm 104 includes a first support beam 114 and a second support beam 116 extending directly between its first and second ends 108, 110, with the support beams 114, 116 being coupled together via one or more cross beams 118 extending circumferentially therebetween. The support beams 114, 116 may generally correspond to the primary structural components for the fixture 102. For example, as will be described below, one or more fixture trolleys 120 may be mounted to and/or supported by the support beams 114, 116 of each fixture arm 104.

As particularly shown in the illustrated embodiment, the fixture 102 includes five fixture arms 104, one for each support leg 54 configured to form part of each pentagonal-shaped vertical tower section of the disclosed lattice tower structure 50. However, in other embodiments, the tower assembly fixture 102 may include any other suitable number of fixture arms 104 extending radially outwardly from the central framed portion 106, such as less than five fixture arms or greater than five fixture arms, with such number corresponding to or differing from the number of support legs 54 configured to be installed within each tower section. As such, the disclosed fixture 102 may be configured to allow tower sections having any suitable shape (e.g., triangular, square, hexagonal, etc.) to be assembled thereon.

In several embodiments, prior to assembling the fixture arms 104, a plurality of base or fixture pads 122 may be placed along the ground at the anticipated locations of the fixture arms 104. Specifically, as shown in FIG. 4, fixture pads 122 may be installed on the ground at spaced apart locations along the anticipated radial footprint of each fixture arm 104. Thereafter, the fixture arms 104 may be placed on top of the pads 122 and subsequently coupled to one another. Such fixture pads 122 may generally be configured to assist in preventing shifting or disruption of the underlying ground during assembly of the tower section(s) of the lattice tower structure 50 onto the tower assembly fixture 102, thereby maintaining a level, planar surface for the fixture 102.

Additionally, as shown in FIG. 4, circumferential spacers 124 may also be configured to be coupled between adjacent fixture arms 104 as the fixture arms 104 are being assembled to ensure proper circumferential positioning of the arms 104 relative to one another. In several embodiments, the circumferential spacers 124 may correspond to temporary components of the fixture 102 that are configured to be removed during final assembly thereof. For instance, in one embodiment, the circumferential spacers 124 may be configured to be maintained in place while suitable tensioning rods 126 are installed between the fixture arms 104. Specifically, as shown in FIG. 4, one or more tensioning rods 126 may be installed between each pair of adjacent fixture arms 104 so as to provide a permanent means for maintaining the relative positioning of the fixture arms 104. In such an embodiment, once the tensioning rods 126 are installed, the circumferential spacers 124 may be removed from the fixture 102. Alternatively, the circumferential spacers 124 may be maintained between the fixture arms 104 following installation of the tensioning rods 126 (or may be used as an alternative to the tensioning rods 126 for maintaining proper spacing between the arms 104).

Moreover, as shown in FIG. 5, the tower assembly fixture 102 may also include one or more radially extending platforms 128 configured to be installed along the side(s) of each fixture arm 104. The platforms 128 may generally correspond to walking platforms for providing service personnel a stable walking area adjacent to each fixture arm 104. As shown in the illustrated embodiment, one or more platforms 128 are installed along both sides of each fixture arm 104. However, in other embodiments, a platform(s) 128 may only be installed along a single side of each fixture arm 104.

Additionally, as shown in FIG. 5, one or more trolleys 120 may be configured to be installed onto each fixture arm 104. As will be described below, each trolley 102 may be configured to be removably coupled to its corresponding fixture arm 104 at a plurality of different radial locations along the length of the fixture arm 104. Such adjustable positioning of the trolleys 120 relative to the fixture arms 104 may allow the fixture 102 to be utilized when assembling tower sections having differing radial dimensions. As shown in FIG. 5, a single trolley 120 is installed onto each fixture arm 104. However, as will be described below with reference to FIG. 17, two or more trolleys 120 may be installed onto each fixture arm 104 to allow two or more tower sections to be assembled on the fixture 102 simultaneously.

Figure 6:
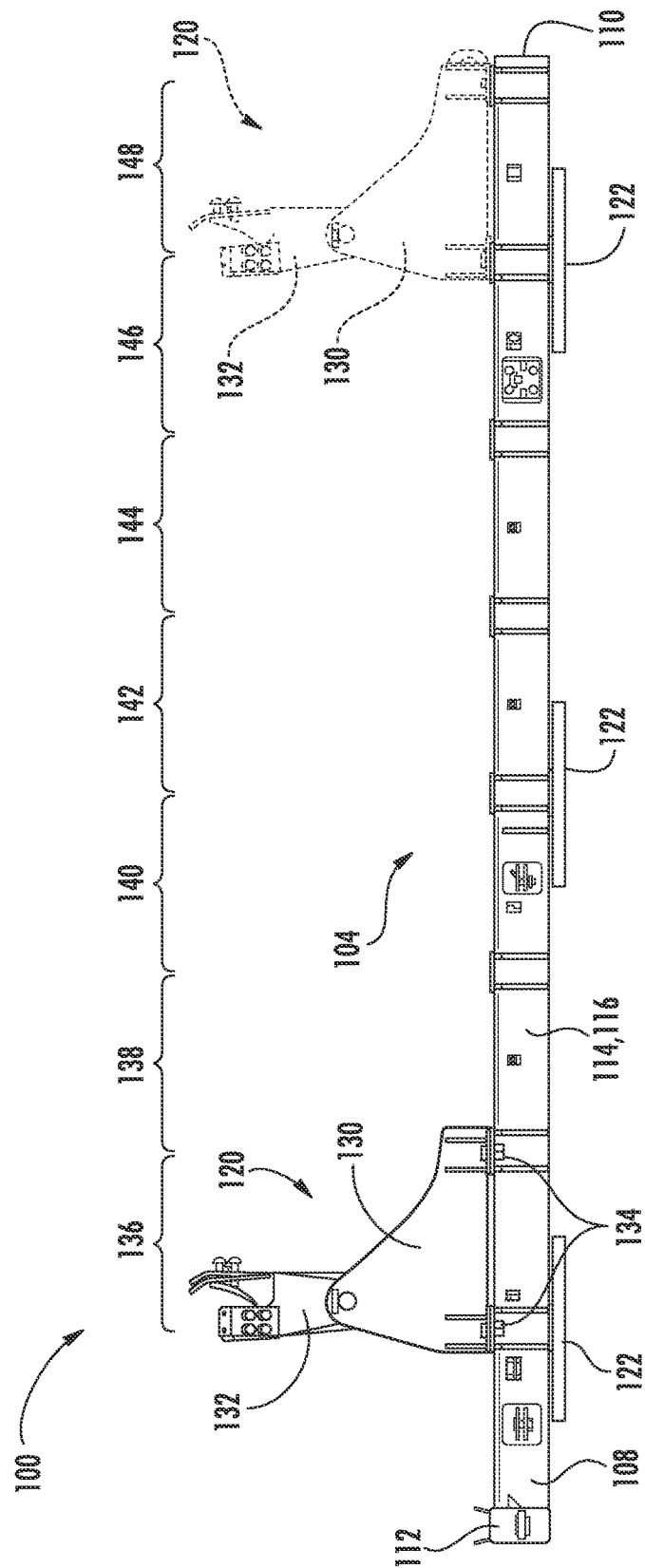
FIG. 6 illustrates a side view of one of the fixture arms of the tower assembly fixture shown in FIGS. 4 and 5, particularly illustrating the various radial locations along which a trolley may be installed onto the fixture arm.

Referring now to FIG. 6, a side view of one of the fixture arms 104 described above with reference to FIGS. 4 and 5 is illustrated in accordance with aspects of the present subject matter, particularly illustrating a trolley 120 installed on the fixture arm 104 as well as the various radial locations that the trolley 120 may be moved along the length of the fixture arm 104. As shown, the trolley 120 may generally include a base frame 130 configured to be removably coupled to the fixture arm 104 and a leg mount 132 pivotally coupled to the base frame 130 that is configured to be secured to one of the support legs 54 included within the tower section being assembled onto the fixture 102.

In general, the base frame 130 of the trolley 120 may be configured to be removably coupled to the support beam(s) 116, 118 of the fixture arm 104 using any suitable attachment means known in the art. For instance, as shown in the illustrated embodiment, mechanical fasteners 134 (e.g., bolts, pins and/or the like) may be utilized to couple each corner of the base frame 130 (only two corners being shown in FIG. 6) to the support beams 116, 118 (only one of which is shown). Alternatively, any other suitable attachment means may be utilized to removably couple the base frame 130 to the support beams 116, 118, such as clamps, brackets, fixture devices and/or any other suitable attachment devices.

As indicated above, by configuring the base frame 130 to be removably coupled to the support beams 116, 118, the trolley 120 may be moved radially along the length of the fixture arm 104 to allow tower sections having differing radial dimensions to be assembled on the fixture 102. For instance, as shown in the illustrated embodiment, the trolley 120 may be installed at seven different radial locations defined along the length of the fixture arm 104 between its first and second ends 108, 110, namely a first radial location 136, a second radial location 138, a third radial location 140, a fourth radial location 142, a fifth radial location 144, a sixth radial location 146 and a seventh radial location 148.

Thus, depending on the radial dimension of the particular tower section that is being assembled on the fixture 104, the trolleys 120 may be positioned at the appropriate radial location on the fixture arms 104 for assembling such tower section. For example, referring to the embodiment of the lattice tower structure 50 shown in FIG. 2, the trolleys 120 may be positioned at the seventh radial location 148 to allow the eleventh tower section 80 to be assembled on the fixture 102. Similarly, the trolleys 120 may be positioned at the sixth, fifth, fourth, third and second radial locations 146, 144, 142, 140, 138 to allow the tenth, ninth, eighth, seventh and sixth tower sections 78, 76, 74, 72, 70, respectively, to be assembled on the fixture 102. Moreover, given that the top, second, third, fourth and fifth tower sections 60, 62, 64, 66, 68 all define the same radial dimension at their bottom ends, the trolleys 120 may be positioned at the first vertical location 136 to assemble such tower sections onto the fixture 102.

It should be appreciated that, in alternative embodiments, the trolleys 120 may be configured to be positioned at any other suitable number of radial locations along the length of each fixture arm 104. Such number may, in several embodiments, generally depend on the number of tower sections desired to be assembled on the fixture 102 that have differing radial dimensions.

Moreover, as indicated above, the leg mount 132 for each trolley 120 may be configured to be pivotally coupled to its corresponding base frame 130. Such a pivotal connection may allow for the angle of orientation of the leg mount 132 to be adjusted, as needed, to accommodate the differing vertical orientations of the legs 54 used across the various tower sections. For instance, in one embodiment, to assemble the top, sixth, seventh, eighth, ninth, tenth and eleventh tower sections 60, 70, 72, 74, 76, 78, 80, the leg mount 132 may be required to be oriented at a first angle relative to vertical (e.g., about five degrees) whereas, to assemble the second, third, fourth and fifth tower sections 62, 64, 66, 68, the leg mount 132 may be required to be oriented at a different, second angle relative to vertical (e.g., about zero degrees).

Figure 7:
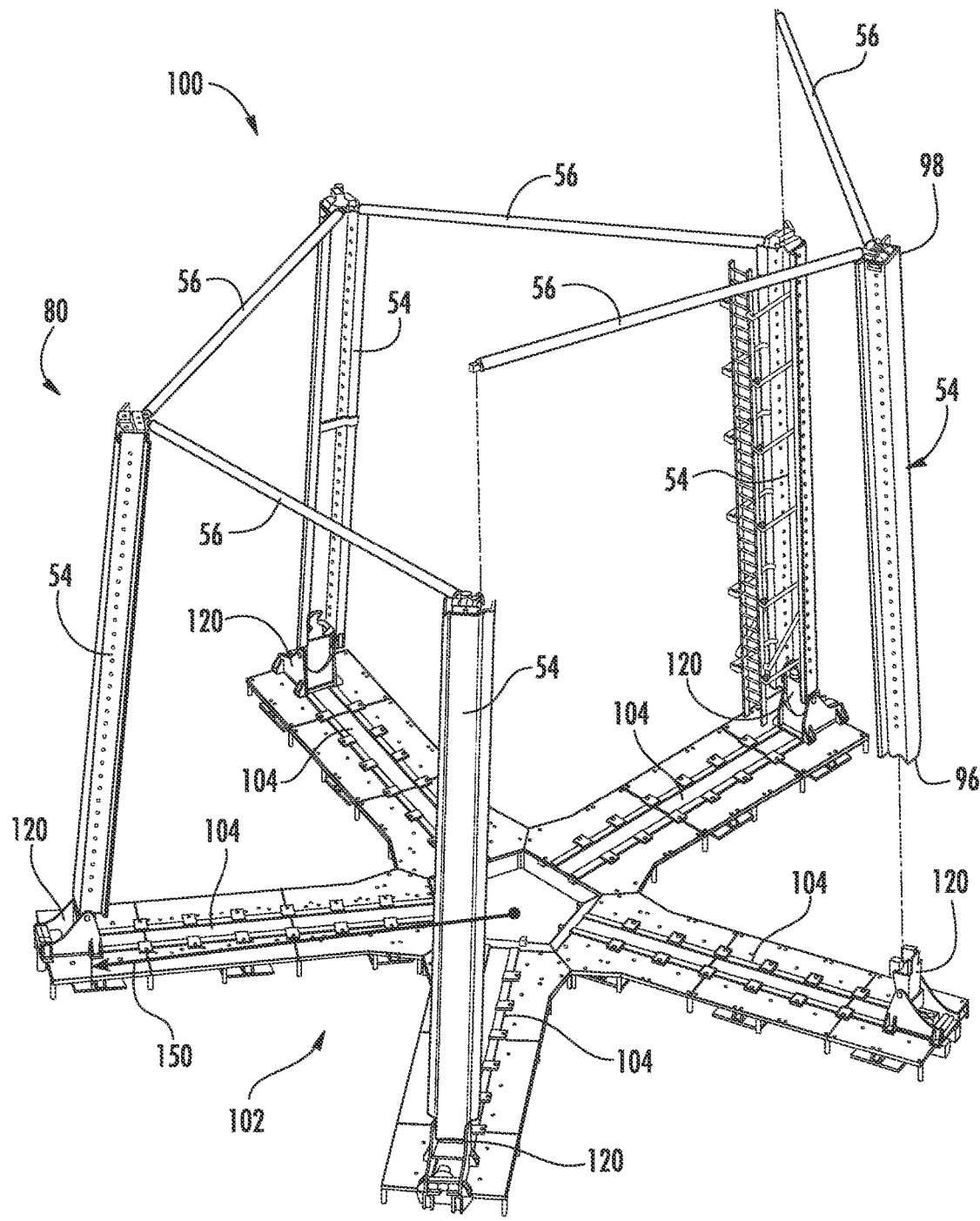
FIG. 7 illustrates a perspective view of one embodiment of a tower section being assembled onto the disclosed tower assembly fixture, particularly illustrating various tower components of the tower section being exploded away from the fixture.
Figure 8:
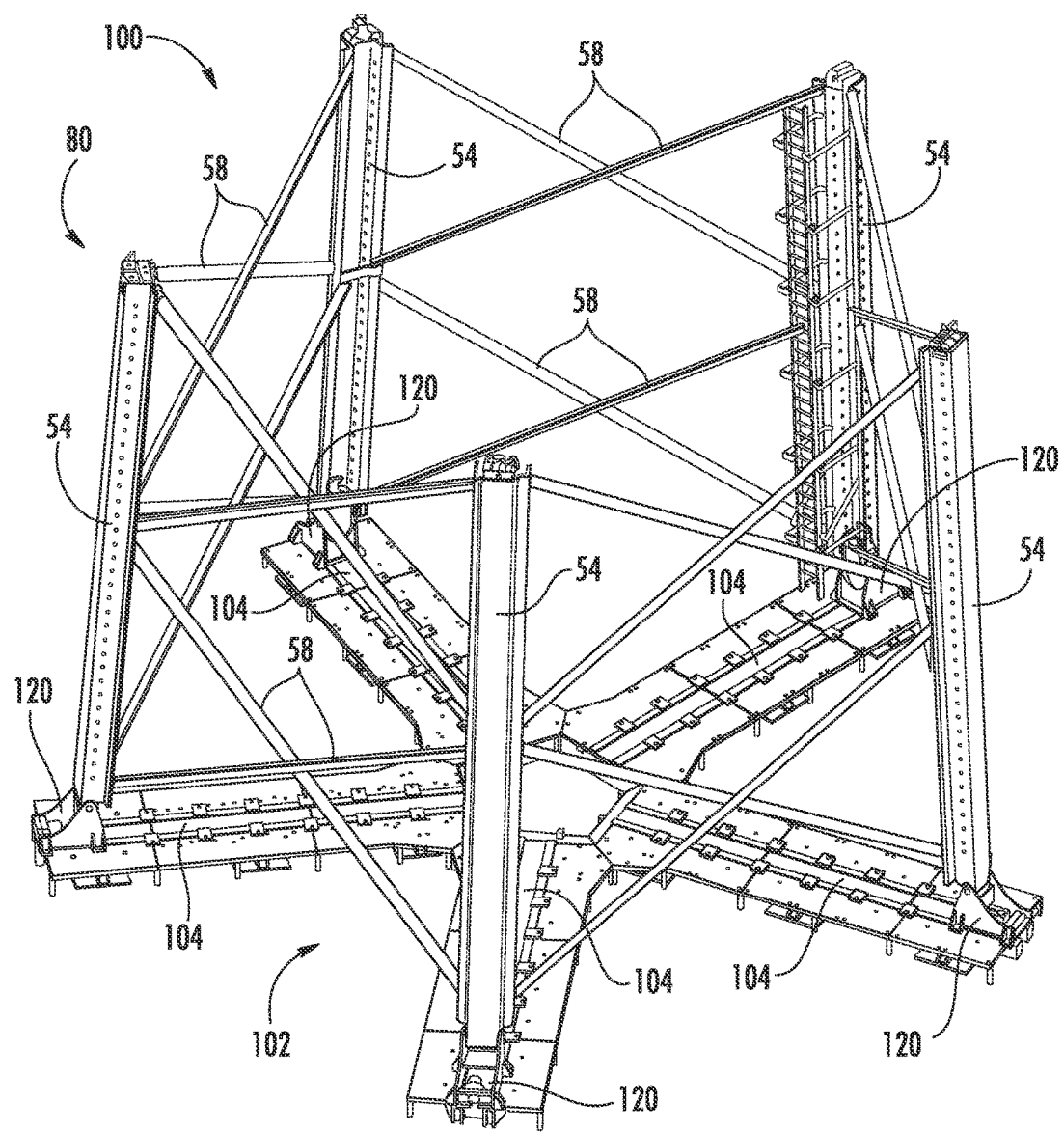
FIG. 8 illustrates another perspective view of the tower section shown in FIG. 7, with various cross-bracing members installed between adjacent support legs of the tower section.

Referring now to FIGS. 7 and 8, perspective views showing differing stages of a vertical tower section being assembled on the disclosed fixture 102 are illustrated in accordance with aspects of the present subject matter. Specifically, FIGS. 7 and 8 illustrate the eleventh tower section 80 being assembled onto the fixture 102, with FIG. 7 showing various tower components of such tower section 80 being exploded away from the fixture 102.

As shown, to assemble the eleventh tower section 80, the trolleys 120 may be initially positioned at the appropriate radial location along the fixture arms 104 so as to accommodate the specific radial dimension of the tower section 80. For instance, each tower section may define a radial dimension 150 (FIG. 7) as measured between the center of the tower section and a bottom end 96 of each support leg 54. As shown, in the illustrated embodiment, the eleventh tower section 80 generally defines a radial dimension that requires the trolleys 120 to be positioned at the radially outermost location along the fixture arms 104 (e.g., at the seventh radial location 148). In addition, the angular orientation of the leg mounts 132 may be adjusted, as necessary, to ensure that each leg mount 132 is positioned at the proper orientation associated with the eleventh tower section 80 (e.g., about 5 degrees).

Thereafter, as shown in FIG. 7, the bottom end 96 of each support leg 54 of the tower section 80 may then be mounted to one of the trolleys 120, with circumferential spacers 56 being installed between adjacent legs 54 (e.g., at the top ends 98 of the legs 54) to ensure proper circumferential positioning. Once all of the support legs 54 have been installed onto the fixture 102, suitable cross-bracing members 58 may be coupled between each pair of adjacent legs 544. For instance, as shown in FIG. 8, four cross-bracing members 58 (e.g., forming two "X-shapes") may be installed between each pair of adjacent support legs 504. Thereafter, the circumferential spacers 56 may, in one embodiment, be removed from the assembled tower section 80.

Alternatively, the circumferential spacers 56 and/or the cross-bracing members 58 may be pre-installed between adjacent pairs of support legs 54. In such an embodiment, each support leg 54 of the assembled pair of support legs 54 may then be mounted onto the trolleys 120 at the same time.

It should be appreciated that the various other vertical tower sections may be similarly assembled onto the fixture 102. For example, to assemble each of the tenth, ninth, eighth, seventh and sixth tower sections 78, 76, 74, 72, 70, the trolleys 120 may be initially moved to the appropriate radial location associated with the tower section being assembled. Thereafter, the support legs 54 for the tower section may be mounted to the trolleys 120, with circumferential spacers 56 being installed between each pair of adjacent legs 54. The cross-bracing members 58 may then be installed between the support legs 54 to complete the assembly.

Figure 9:
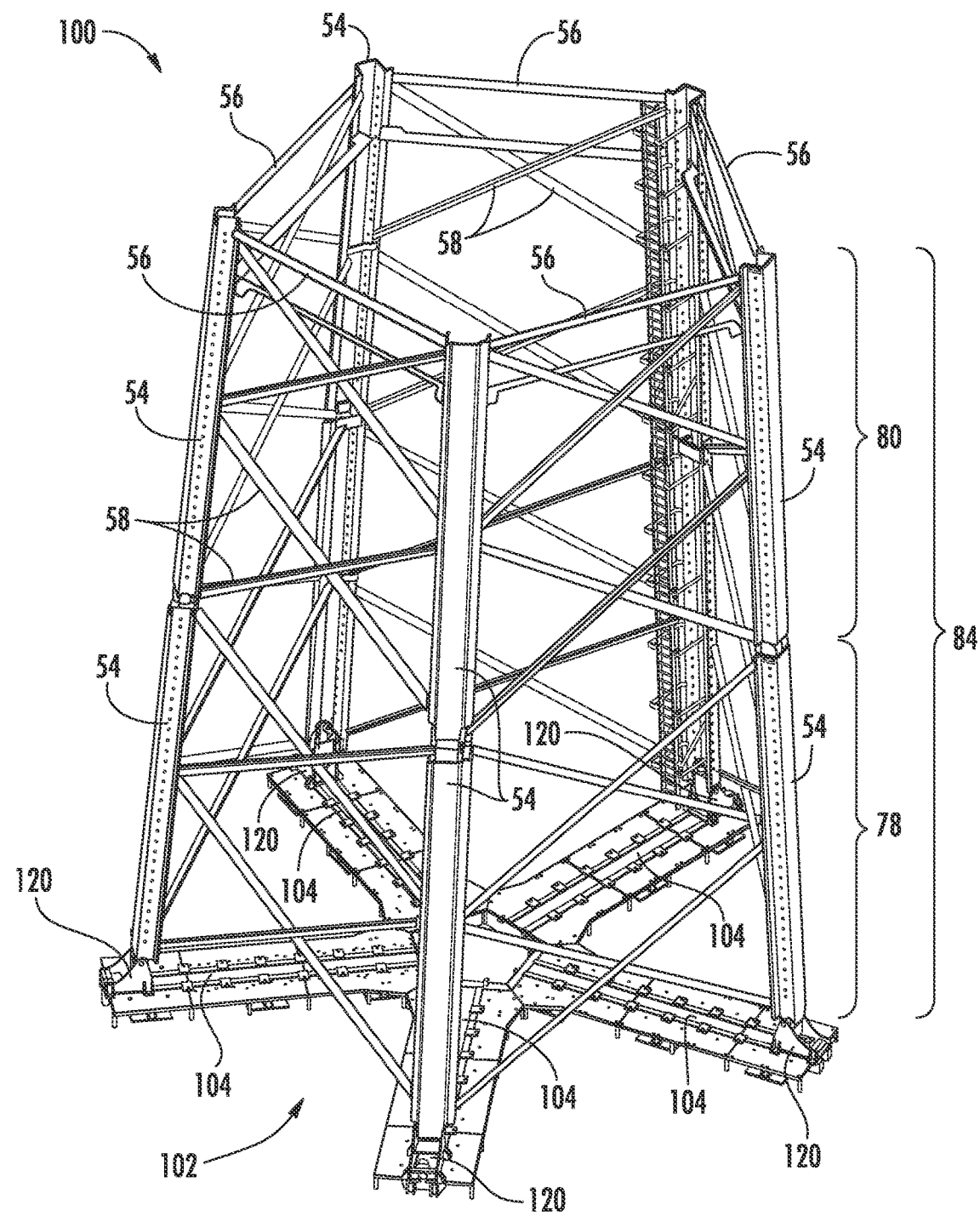
FIG. 9 illustrates a perspective view of the tower section shown in FIG. 8 with a separate tower section assembled on top thereof so as to form a vertical tower stack on the tower assembly fixture.

It should also be appreciated that, as an alternative to assembling each tower section on the fixture 102 individually, the tower sections may be assembled one on top of the other on the fixture 102 to form a stack of two or more tower sections. Specifically, as indicated above, it may be desirable to assemble pairs of tower sections together on the fixture 102, with the resulting vertical tower stack then being transferred over to the final tower location 44 for final assembly within the lattice tower structure 50. For example, FIG. 9 illustrates a perspective view of the eleventh and tenth tower sections 80, 78 assembled together on the fixture 102 to form the first vertical stack 84. In such an embodiment, the eleventh tower section 80 may be initially assembled on the fixture 102 as described above with reference to FIGS. 7 and 8. Thereafter, the tenth tower section 78 may be assembled on top of the eleventh tower section 80 by coupling the bottom ends 96 of its support legs 54 to the top ends 98 of the support legs 54 of the eleventh tower section 80, with suitable circumferential spacers 56 being installed between the adjacent legs 54 of the tenth tower section 78 to maintain proper positioning. The cross-bracing members 58 may then be installed, as desired, between the adjacent legs 54 of the tenth tower section 78.

Figure 22:
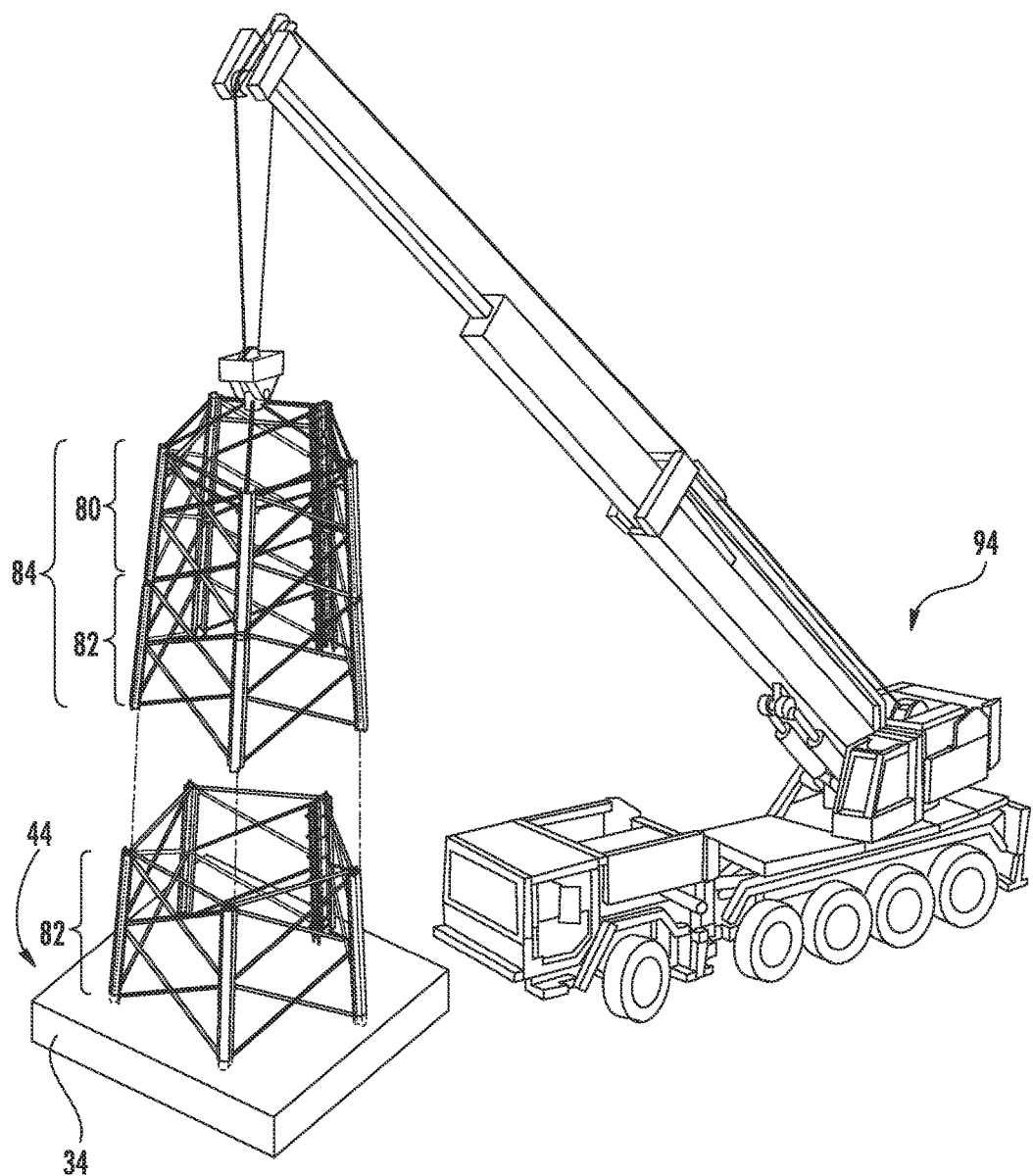
FIG. 22 illustrates another perspective view of the tower section shown in FIG. 3 with the vertical tower stack shown in FIG. 9 being lowered downward thereon via a crane.

By assembling a vertical stack of two or more tower sections on the fixture 102, the stack may then be transferred as a whole to the final tower location 44 of the lattice tower structure 50 for final assembly. For example, FIG. 22 illustrates a perspective view of the vertical stack 84 shown in FIG. 9 being lowered down onto the bottom tower section 82 of the lattice tower structure 50 shown in FIG. 3. Specifically, a crane 94 or other suitable lifting device may be used to lift the vertical stack 84 from the fixture 102 and transport the stack 84 to the final tower location 44. The stack 84 may then be lowered into place to allow the adjacent tower sections to be coupled to one another. For instance, in the illustrated embodiment, the bottom ends 96 of the support legs 54 of the eleventh tower section 80 may be coupled to the top ends 98 of the support legs 54 of the bottom tower section 82.

It should be appreciated that, similar to the vertical stack 84 shown in FIG. 9, various other tower sections may be assembled together to form a vertical stack that may then be lifted up and installed at the final tower location. For instance, as indicated above with reference to FIG. 2, a second vertical stack 86 may be formed by stacking the eighth and ninth tower sections 74, 76 on the fixture 102 and a third vertical stack 88 may be formed by stacking the sixth and seventh tower sections 70, 72 on the fixture 102. Similarly, a fourth vertical stack 90 may be formed by stacking the fourth and fifth tower sections 66, 68 on the fixture 102 while a fifth vertical stack 92 may be formed by stacking the second and third tower section 62, 64 on the fixture 102.

It should also be appreciated that, in several embodiments, some or all of the circumferential spacers 56 utilized during the assembly process to ensure proper circumferential spacing of the legs 54 may also function as cladding brackets. In such embodiments, the cladding brackets may be maintained on the tower section(s) to allow the cladding material 52 to be coupled to the resulting lattice tower structure 50. For instance, in one embodiment, circumferential spacers 56 doubling as cladding brackets may be installed between the adjacent legs 54 of every other tower section (e.g., the even-numbers tower sections) to allow the cladding material 52 to be coupled thereto. Thus, in the embodiment shown in FIG. 9, the circumferential spacers 56 shown at the top of the tenth tower section 78 may, for example, correspond to suitable cladding brackets for the latter tower structure 50.

Figure 10:
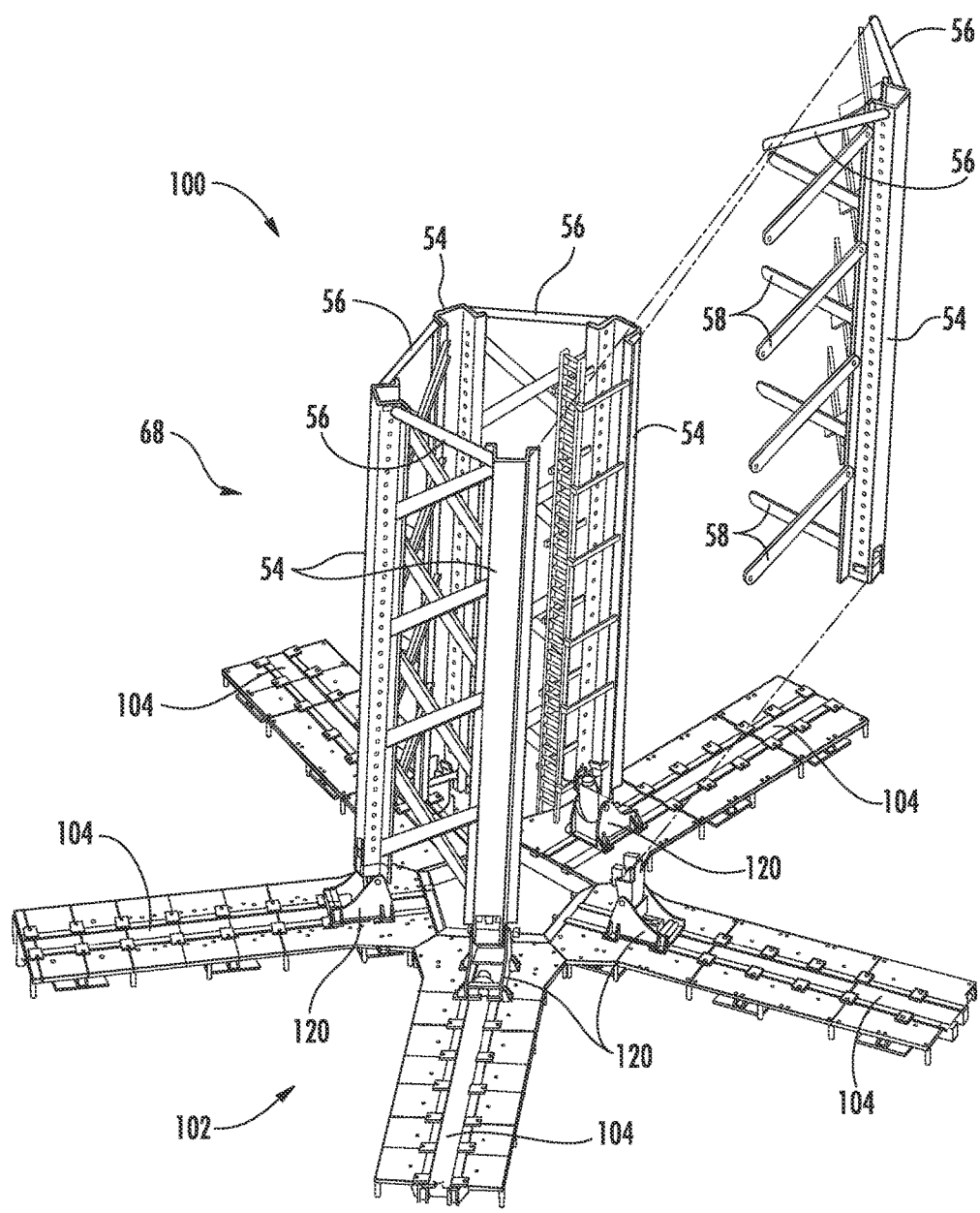
FIG. 10 illustrates another perspective view of one embodiment of a tower section being assembled onto the disclosed tower assembly fixture, particularly illustrating various tower components of the tower section being exploded away from the fixture.

Referring now to FIG. 10, another perspective view showing a tower section being assembled on the disclosed tower assembly fixture 102 is illustrated in accordance with aspects of the present subject matter. Specifically, FIG. 10 illustrates the fifth tower section 68 being assembled onto the fixture 102, with various tower components of such tower section 68 being exploded away from the fixture 10.

As shown, to assemble the fifth tower section 68, the trolleys 120 may be initially positioned at the appropriate radial location along the fixture arms 104 so as to accommodate the specific radial dimension of the tower section 68. For instance, as shown in FIG. 10, the fifth tower section 68 generally defines a radial dimension that requires the trolleys 120 to be positioned at the radially innermost location along the fixture arms 104 (e.g., at the first radial location 136). In addition, the angular orientation of the leg mounts 132 may be adjusted, as necessary, to ensure that each leg mount 132 is positioned at the proper orientation associated with the fifth tower section 68 (e.g., about zero degrees).

Thereafter, as shown in FIG. 10, the support legs 54 of the tower section 68 may then be mounted to each trolley 120, with circumferential spacers 56 being installed between adjacent legs 54 to ensure proper circumferential positioning. Once all of the support legs 54 have been installed onto the fixture 102, suitable cross-bracing members 58 may be coupled between each pair of adjacent legs 54. For instance, as shown in FIG. 10, eight cross-bracing members 58 (e.g., forming four "X-shapes") may be installed between each pair of adjacent support legs 54. Thereafter, the circumferential spacers 56 may, in one embodiment, be removed from the assembled tower section.

As indicated above, in several embodiments, the fourth, third and second tower sections 66, 64, 62 may all define the same or substantially the same radial dimension as the fifth tower section 68 with respect to the position of the bottom ends 96 of each of their support legs 54 relative to the center of each tower section. As a result, such tower sections may be similarly assembled onto the fixture 102 without having to adjust the radial positioning of the trolleys 120 along the fixture arms 104. For example, to assemble each of the fourth, third, and second tower sections 66, 64, 62, the support legs 54 for each tower section may be mounted to the trolleys 102, with circumferential spacers 56 being installed between each pair of adjacent legs 54. The cross-bracing members 58 may then be installed between the support legs 54 to complete the assembly.

Figure 11:
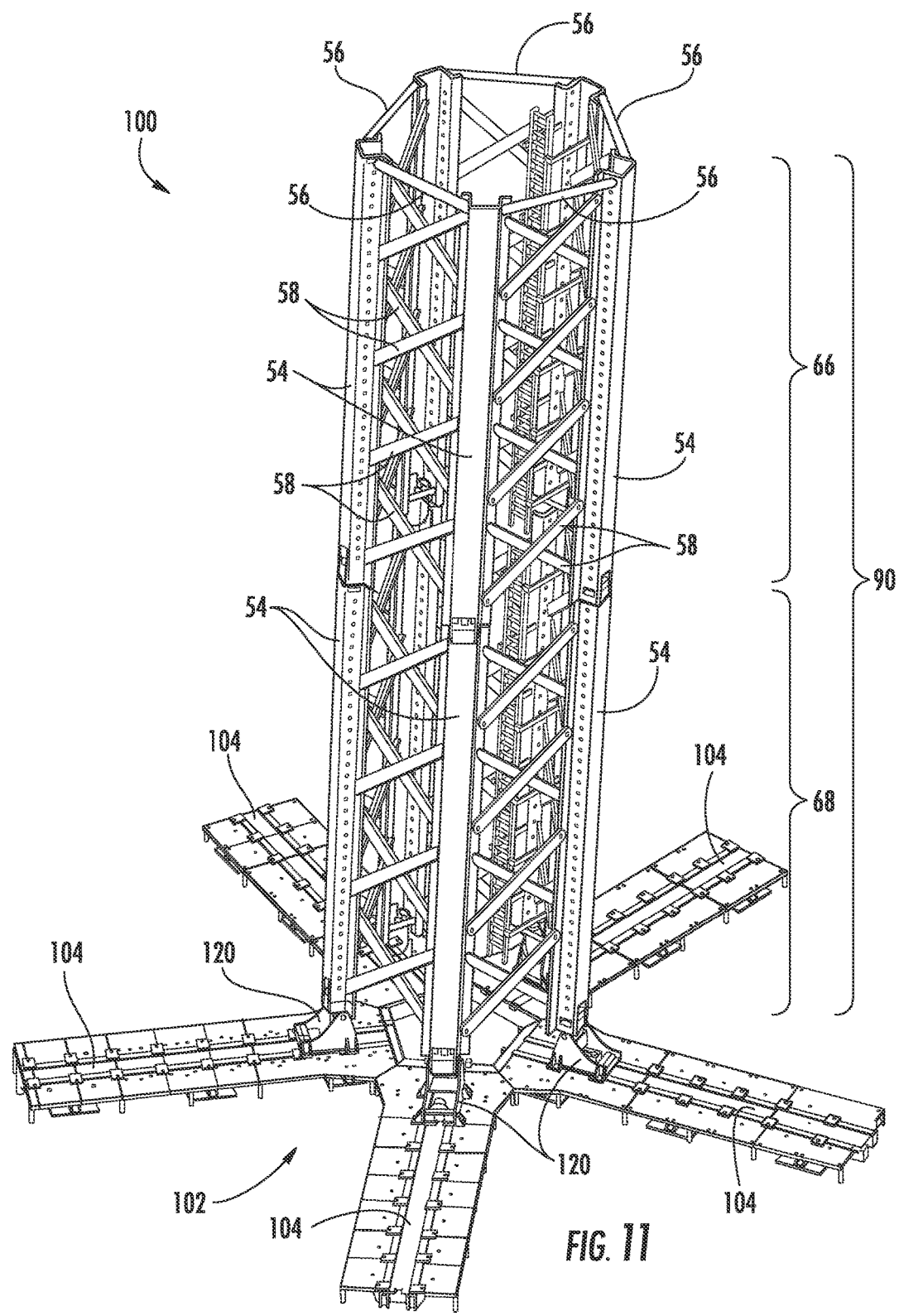
FIG. 11 illustrates a perspective view of the tower section shown in FIG. 10 with a separate tower section assembled on top thereof so as to form a vertical tower stack on the tower assembly fixture.

Additionally, as indicated above, the tower sections may be configured to be assembled one on top of the other on the fixture 102 to form a stack of two or more tower sections. For example, FIG. 11 illustrates a perspective view of the fifth and fourth tower sections 68, 66 assembled together on the fixture to form the fourth vertical stack 90. In such an embodiment, the fifth tower section 68 may be initially assembled on the fixture 102 in the manner described above with reference to FIG. 10. Thereafter, the fourth tower section 66 may be assembled on top of the fifth tower section 68 by coupling the bottom ends 96 of its support legs 54 to the top ends 98 of the support legs 54 of the fifth tower section 68, with suitable circumferential spacers 56 being installed between the adjacent legs 54 of the fourth tower section 66 to maintain proper positioning. The cross-bracing members 58 may then be installed, as desired, between the adjacent legs 54 of the fourth tower section 66. The resulting vertical stack 90 may then be lifted off of the fixture 102 via a crane and transported to the final tower location 44 for assembly on top of the previously installed tower section(s). For instance, referring to the embodiment shown in FIG. 2, the fourth vertical stack 80 formed by the fourth and fifth tower sections 66, 68 may be installed at the final tower location 44 by coupling the bottom ends 96 of the support legs 54 of the fifth tower section 68 to the top ends 98 of the support legs 54 of the previously installed sixth tower section 70.

Figure 12:
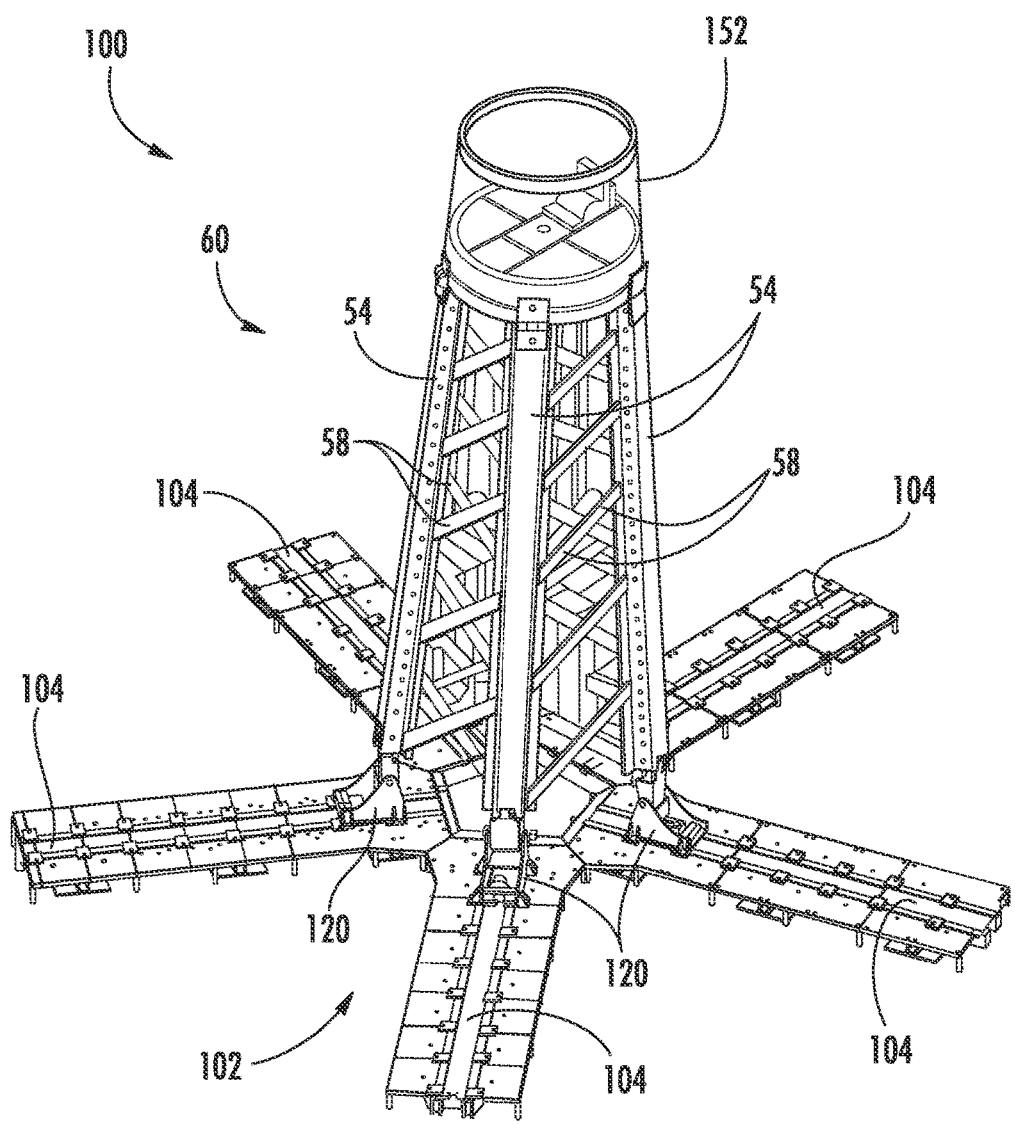
FIG. 12 illustrates a further perspective view of one embodiment of a tower section being assembled onto the disclosed tower assembly fixture.

Referring now to FIG. 12, another perspective view showing a tower section assembled on the disclosed tower assembly fixture 102 is illustrated in accordance with aspects of the present subject matter. Specifically, FIG. 12 illustrates the top tower section 60 as assembled onto the fixture 102.

As shown, the top tower section 60 may be assembled onto the tower assembly fixture 102 in a manner similar to that described above with reference to FIG. 10 for the fifth tower section 68. Specifically, the trolleys 120 may be initially positioned at the radially innermost location along the fixture arms 104 (e.g., at the first radial location 136) and the angular orientation of the leg mounts 132 may be adjusted, as necessary, to ensure that each leg mount 132 is positioned at the proper orientation associated with the support legs 54 of the top tower section 60 (e.g., about five degrees). Thereafter, the support legs 54 of the tower section 60 may be mounted to each trolley 120, with circumferential spacers 56 being installed, as necessary, between adjacent legs 54 to ensure proper circumferential positioning. Once the support legs 54 have been installed onto the fixture 102, suitable cross-bracing members 58 may be coupled between each pair of adjacent legs 54. For instance, as shown in FIG. 12, ten cross-bracing members 58 (e.g., forming five "X-shapes") may be installed between each pair of adjacent support legs 54. Additionally, as shown in FIG. 12, an uptower support assembly 152 may also be installed on top of the support legs 54 of the top tower section 60. As is generally understood, the uptower support assembly 152 may be configured to support the various uptower components of the wind turbine 40 shown in FIG. 1. For instance, the nacelle 36 (FIG. 1) may be mounted directly on top of the uptower support assembly 152.

Figure 13:
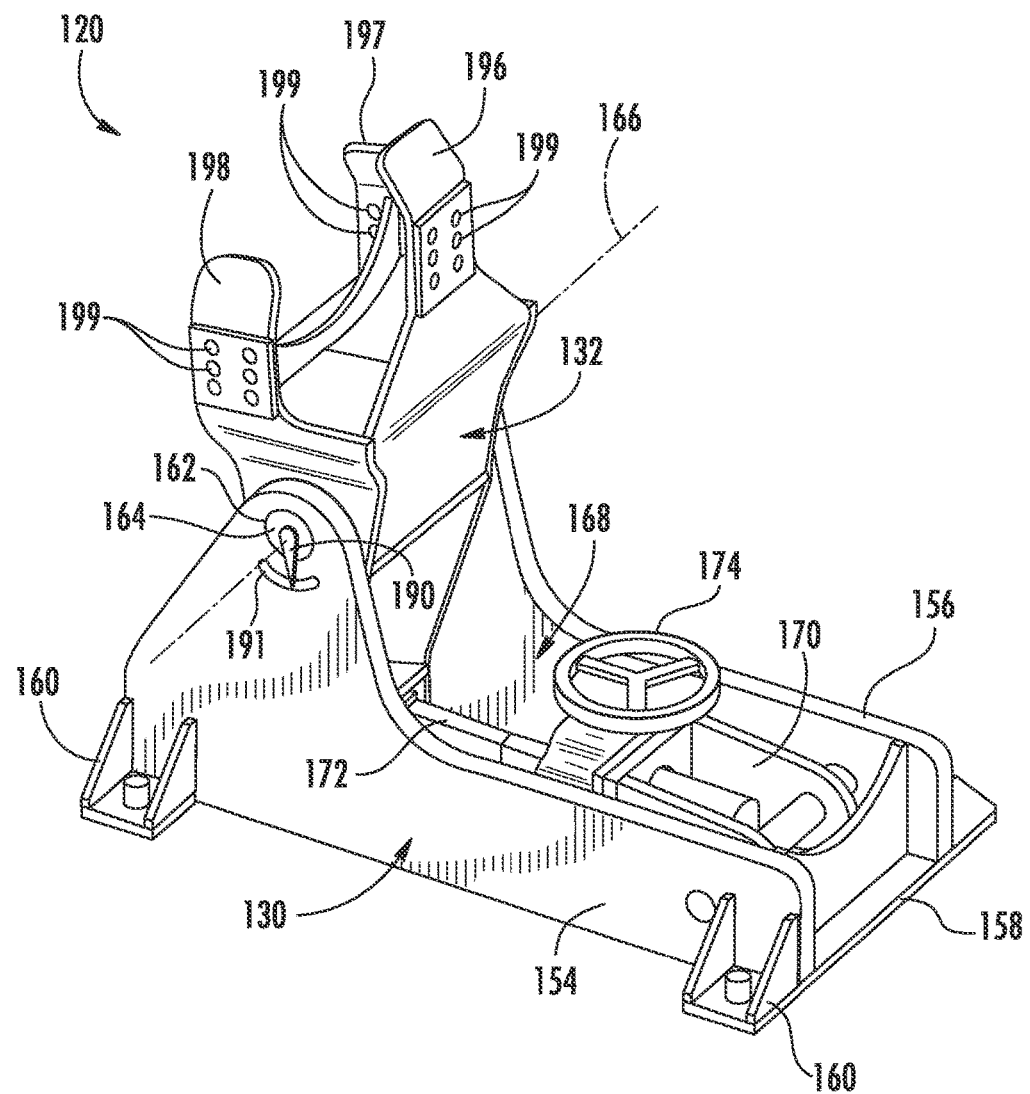
FIG. 13 illustrates a perspective view of one embodiment of a trolley that may be installed onto the disclosed tower assembly fixture in accordance with aspects of the present subject matter.
Figure 14:
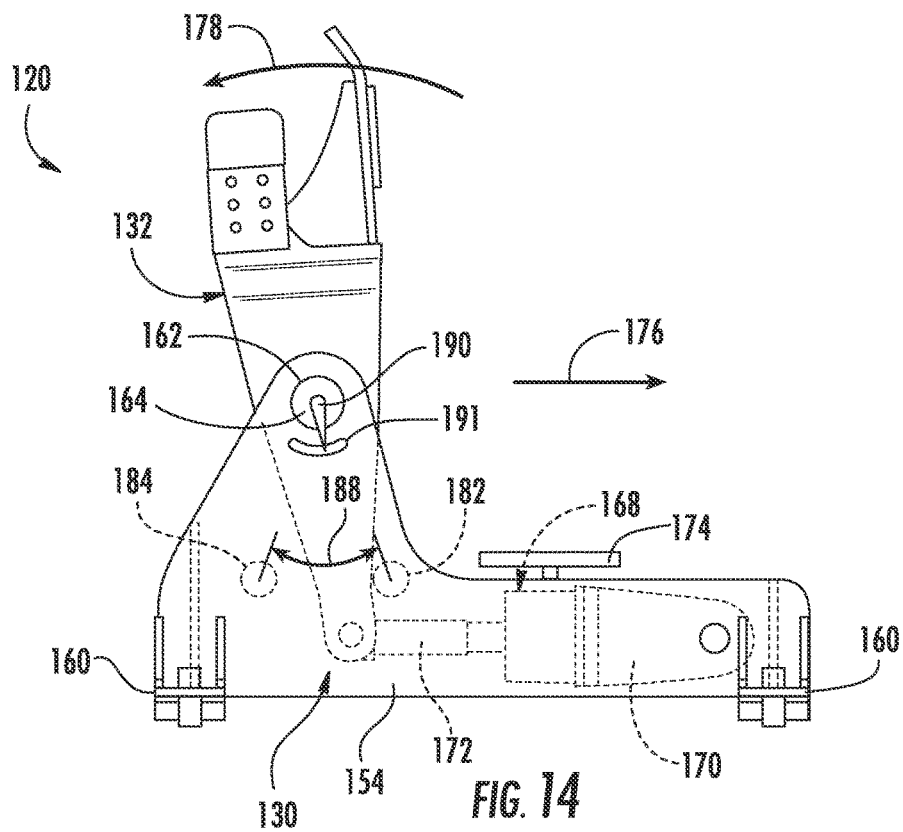
FIG. 14 illustrates a side view of the trolley shown in FIG. 13, particularly illustrating a leg mount of the trolley pivoted to one position relative to a base frame of the trolley.
Figure 15:
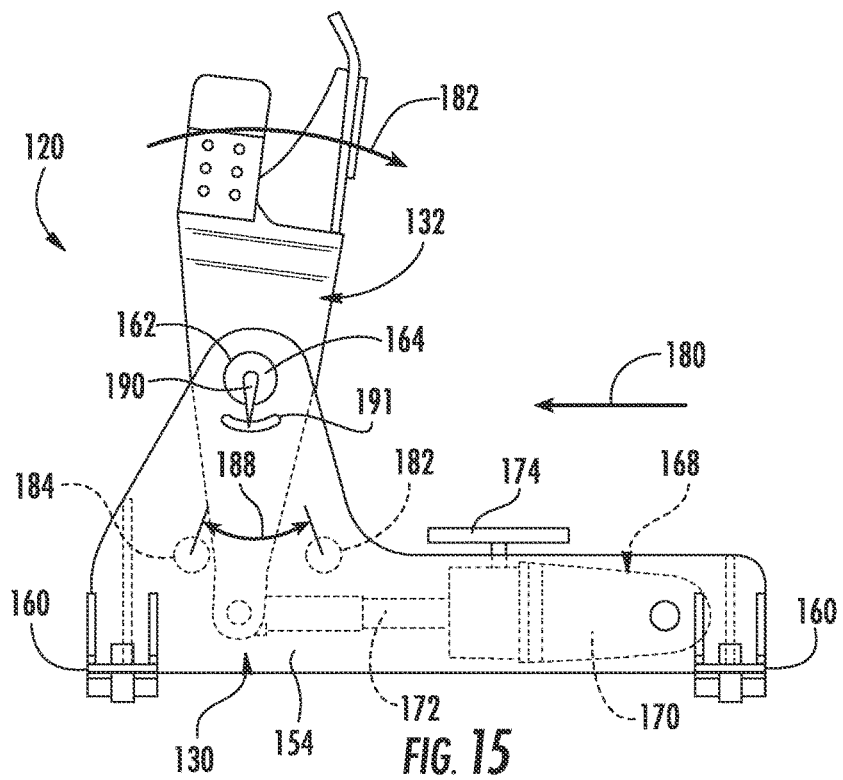
FIG. 15 illustrates another side view of the trolley shown in FIG. 13, particularly illustrating the leg mount pivoted to a different position relative to the base frame.
Figure 16:
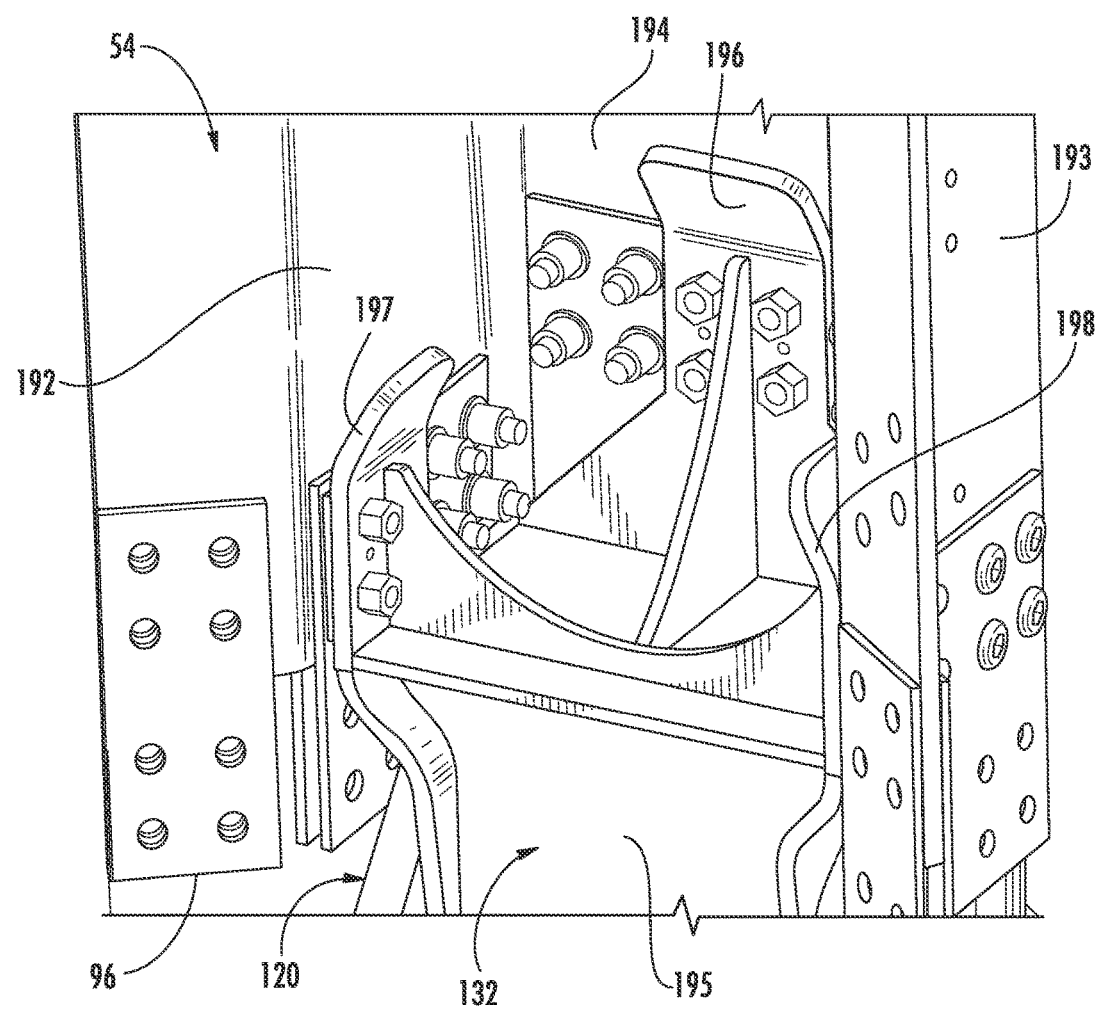
FIG. 16 illustrates a partial perspective view of the trolley shown in FIG. 13, particularly illustrating a support leg coupled to a top portion of the leg mount of the trolley.

Referring now to FIGS. 13-16, several different views of one of the fixture trolleys 120 described above are illustrated in accordance with aspects of the present subject matter. Specifically, FIG. 13 illustrates a perspective view of the trolley 120 and FIGS. 14 and 15 illustrate side views of the trolley 120, particularly illustrating the leg mount 132 of the trolley 120 at different angular orientations relative to its base frame 130. Additionally, FIG. 16 illustrates a partial perspective view of a top portion of the trolley 120 shown in FIG. 13, with the bottom end 96 of a support leg 54 being coupled to the leg mount 132 of the trolley 120.

As particularly shown in FIG. 13, the base frame 130 may generally include a first sidewall 154, a second sidewall 156 spaced apart from the first sidewall 154 and a bottom wall 158 extending between the first and second sidewalls 154, 156. In several embodiments, each sidewall 154, 156 may include a pair of mounting brackets 160 extending outwardly therefrom for receiving suitable attachment devices for coupling the trolley 120 to its corresponding fixture arm 104. For instance, as indicated above, mechanical fasteners 134, such as bolts, pins and/or the like, may be utilized to couple the trolley 120 to its fixture arm 104. In such an embodiment, a fastener 134 may be inserted through each mounting bracket 160 and coupled to one of the support beams 114, 116 of the adjacent fixture arm 104 (e.g., via a nut) to allow the trolley 120 to be coupled to the fixture arm 104.

Additionally, as shown in FIGS. 13-15, the leg mount 132 may be configured to be coupled between the opposed sidewalls 154, 156 of the base frame 130 such that a portion of leg mount 132 extends vertically within a cavity defined between the first and second sidewalls 154, 156. As indicated above, in several embodiments, the leg mount 132 may be configured to be pivotally coupled to the base frame 130. For instance, as shown in FIGS. 13-15, an opening 162 may be defined in each sidewall 154, 156 that is configured to receive a corresponding projection 164 extending outwardly from each side of the leg mount 132. Such a pinned or pivotal connection may provide a means for pivoting or rotating the leg mount 132 about a pivot axis 166 (FIG. 13) extending through the center of the openings 162 defined in the sidewalls 154, 156, thereby allowing for the angular orientation of the leg mount 132 to be adjusted relative to the base frame 130. It should be appreciated that, in other embodiments, the pivotal connection provided between the leg mount 132 and the base frame 130 may be achieved using any other suitable means and/or configuration that allows for the angular orientation of the leg mount 132 to be adjusted relative to the base frame 130.

Moreover, as shown in the illustrated embodiment, the trolley 120 may also include an angle adjustment device 168 coupled between the base frame 130 and the leg mount 132 for adjusting the angular orientation of the leg mount 130. Specifically, as shown in FIGS. 13-15, the angle adjustment device 168 corresponds to a screw jack including a jack portion 170 coupled the base frame 130 and a screw portion 172 coupled to a bottom end of the leg mount 132. In such an embodiment, by linearly actuating the screw portion 172 (e.g., by turning a wheel 174 associated with the jack portion 170), the angular orientation of the leg mount 132 relative to the base frame 130 may be adjusted. For instance, as shown in FIG. 14, by linearly actuating the screw portion 172 in a first direction (as indicated by arrow 174), the leg mount 132 may be rotated relative to the base frame 130 about the rotational axis in a first rotational direction (as indicated by arrow 178). Similarly, as shown in FIG. 15, by linearly actuating the screw portion 172 in a second, opposite direction (as indicated by arrow 180), the leg mount 132 may be rotated relative to the base frame 130 about the rotational axis in a second, opposite rotational direction (as indicated by arrow 182).

As shown in FIGS. 14 and 15, in one embodiment, the base frame 132 may include pivot stops 184, 186 positioned both forward and aft of the leg mount 132 that serve to limit the movement of the leg mount 132 relative to the base frame 130. Specifically as shown in FIG. 14, the screw portion 172 may be linearly actuated in the first direction 176 until the leg mount 132 contacts a first pivot stop 184 positioned aft of the leg mount 132. Additionally, as shown in FIG. 15, the screw portion 172 may be linearly actuated in the second direction 180 until the leg mount 132 contacts a second pivot stop 186 positioned forward of the leg mount 132. As a result, the first and second pivot stops 184, 186 may generally define an angular range of travel 188 across which the leg 132 mount may be pivoted relative to the base frame 130.

Additionally, in several embodiments, the trolley 120 may also include an angle indicator for providing an indication of the angular orientation of the leg mount 132 relative to the base frame 130. Specifically, as shown in FIGS. 13-15, in one embodiment, an angle marker 190 may be coupled to one of the projections 164 extending through the openings 162 defined in the sidewalls 154, 156 such that the angle marker 190 is positioned along an exterior surface of the base frame 130. Additionally, as shown in the illustrated embodiment, an angle reference guide 191 may be provided on the exterior surface of the base frame 130 adjacent to the angle marker 190. The angle reference guide 191 may, for example, include markings, numbers and/or any other suitable feature(s) that provide an indication of the angular orientation of the leg mount 132. As such, when the leg mount 132 is pivoted relative to the base frame 130, the orientation of the angle marker 190 relative to the angle reference guide 191 may be referenced to allow a service worker to quickly and easily determine the current angular orientation of the leg mount 132.

As indicated above, the leg mount 132 may be configured to be coupled to the bottom end 96 of one of the support legs 54 of the tower section being assembled onto the tower assembly fixture 102. As such, the leg mount 132 may be configured to and/or may include any suitable components and/or features configured to accommodate securing the bottom end 96 of a support leg 54 thereto. For instance, as shown in FIG. 16, in one embodiment, each support leg 54 may correspond to a substantially "U-shaped" support beam having first and second sidewalls 192, 193 and an outer wall 194 extending between the sidewalls 192, 193. In such an embodiment, a widthwise dimension of a top portion 195 of the leg mount 132 may be designed to be less than a corresponding width of the gap defined between the sidewalls 192, 193 at the bottom end 96 of the support leg 54 such that the top portion 195 of the leg mount 132 may be received within the "U-shaped" channel defined by the support leg 64.

Additionally, the leg mount 132 may also include one or more mounting plates 196, 197, 198 for coupling the leg mount to the bottom end of the support leg. For instance, as shown in the illustrated embodiment, the leg mount 132 includes an outer mounting plate 196 and first and second side mounting plates 197, 198 extending substantially vertically from the top portion 195 of the leg mount 132, with each mounting plate 196, 197, 198 including a plurality of mounting holes 199 (FIG. 13) for receiving suitable mechanical fasteners. In such an embodiment, when the top portion 195 of the leg mount 132 is received within the "U-shaped" channel defined by the support leg 54, the first and second mounting plates 197, 198 may be configured to extend adjacent to the inner surfaces of the first and second sidewalls 192, 193, respectively, of the support leg 54 while the outer mounting plate 196 may be configured to extend adjacent to the inner surface of the outer wall 194. Mechanical fasteners may then be inserted through both the mounting holes 199 defined in the mounting plates 196, 197, 198 and corresponding openings (not shown) defined in the walls of the support leg 54 to allow the leg 54 to be coupled to the leg mount 132.

Figure 17:
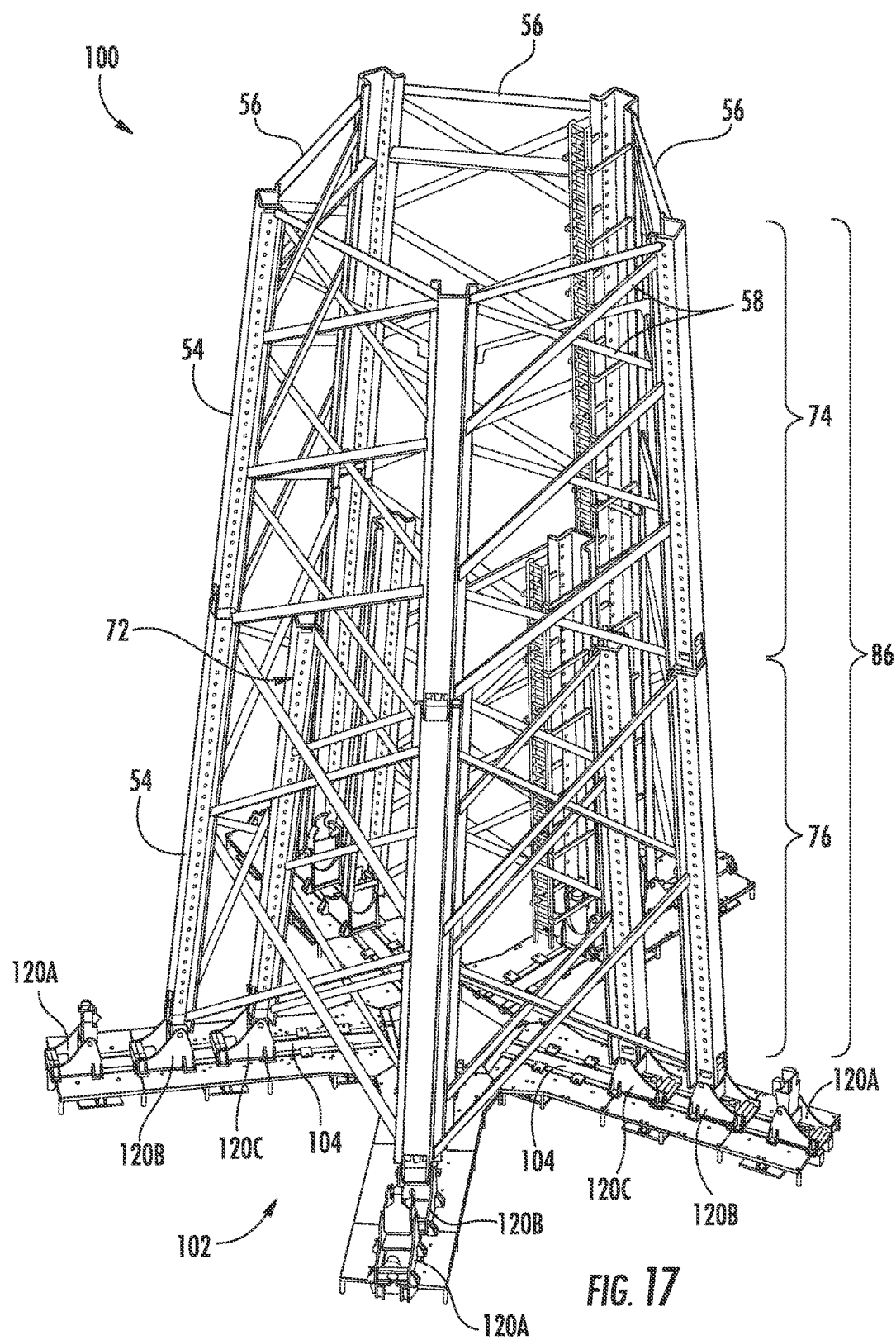
FIG. 17 illustrates a perspective view of one embodiment of a nesting configuration that may be utilized to assemble multiple tower sections onto the disclosed tower assembly fixture at differing radial locations on the fixture in accordance with aspects of the present subject matter.

Referring now to FIG. 17, a perspective view of an embodiment in which nested tower sections have been assembled onto the disclosed tower assembly fixture 102 is illustrated in accordance with aspects of the present subject matter. As shown in FIG. 17, as opposed to only installing a single trolley 120 onto each fixture arm 104 of the tower assembly fixture 102, multiple trolleys 120A, 120B, 120C may be installed onto the fixture arms 104 at different radial locations along the length of each arm 104. As a result, tower sections having differing radial dimensions may be assembled simultaneously onto the fixture 102 in a nesting configuration, thereby further increasing the efficiency at which the lattice tower structure 50 may be installed at a wind turbine location.

In the illustrated embodiment, three trolleys have been installed onto each fixture arm 104, namely a first trolley 120A, a second trolley 120B and a third trolley 120C, with the trolleys 120A, 120B, 120C being disposed at different radial locations along the length of each fixture arm 104. Specifically, as shown in FIG. 17, each first trolley 120A is installed onto its respective fixture arm 104 at the seventh radial location 148 defined on each fixture arm 104, which may correspond to the radial location for assembling the eleventh tower section 80 onto the tower assembly fixture 102. Similarly, each second trolley 120B is installed onto its respective fixture arm 104 at the fifth radial location 144, which may correspond to the radial location for assembling the ninth tower section 76 onto the fixture 102. Moreover, each third trolley 120C is installed onto its respective fixture arm 104 at the third radial location 140, which may correspond to the radial location for assembling the seventh tower section 72 onto the fixture 102.

As indicated above, by installing multiple trolleys 120A, 120B, 120C onto each fixture arm 104, the tower sections may be assembled onto the tower assembly fixture 102 in a nesting configuration. For example, as shown in FIG. 17, the seventh tower section 72 has been assembled onto the fixture 102 using the plurality of third trolleys 120C. Additionally, although not shown, by assembling the seventh tower section 72 onto the fixture 102, the sixth tower section 70 may then be assembled directly on top of the seventh tower section 72 to form the third vertical stack 88. Moreover, as shown in FIG. 17, the ninth tower section 76 has been assembled onto the fixture 102 using the plurality of second trolleys 120B so as to be positioned radially outwardly from the seventh tower section 72, with the eighth tower section 74 being stacked on top thereof to form the second vertical stack 86. Similarly, although not shown, the eleventh tower section 80 (and, optionally, the tenth tower section 80 stacked thereon) may also be assembled onto the fixture 102 using the plurality of first trolleys 120B so as to be positioned radially outwardly from the ninth and eighth tower sections 76, 76. The nested tower sections (or nested vertical stacks) may then be removed individually from the fixture 102 for subsequent installation at the final tower location 44.

Figure 18:
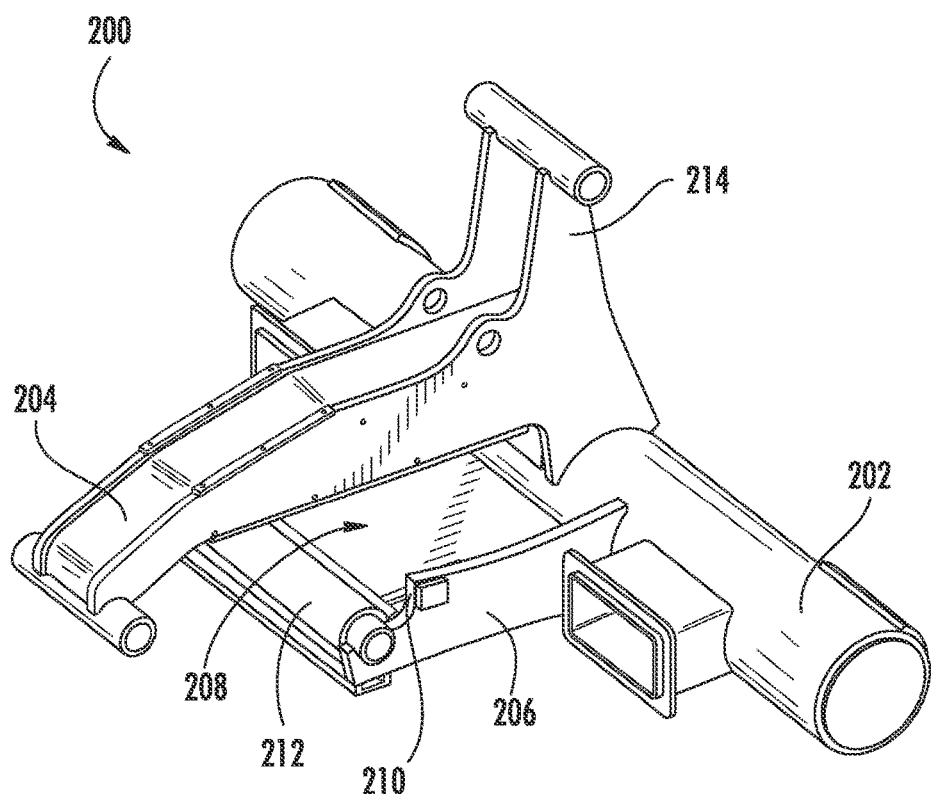
FIG. 18 illustrates a perspective view of one embodiment of an upend device for upending a support leg to be installed within a tower section of the disclosed lattice tower structure in accordance with aspects of the present subject matter.

Referring now to FIG. 18, a perspective view of one embodiment of a upend device 200 configured to facilitate upending the vertical legs 54 from a horizontal position on and/or adjacent to the ground for subsequent installation onto the tower assembly fixture 102 is illustrated in accordance with aspects of the present subject matter. As will be described below, the upend device 200 may allow a support leg 54 to be upended without damaging any components of the support leg 54, such as any splice plates coupled to the bottom end 96 of the support leg 54.

As shown, the upend device 200 may generally include a pivot tube 202 configured to provide a pivot point for rotating or pivoting a support leg 54 relative to the ground as it is being upended. Specifically, as will be described below, the pivot tube 202 may be configured to directly contact the ground so as to provide a means for allowing the bottom end 96 of each support leg 54 to be pivoted relative to the ground as the top end 96 of such support leg 54 is being lifted therefrom in order to upend the leg 54. Additionally, as shown in FIG. 18, the upend device 200 may also include first and second pivot arms 204, 206 extending outwardly from the pivot tube 202 so as to define a channel 208 between the pivot arms 204, 206 for receiving the bottom end 96 of the support leg 54. Specifically, in several embodiments, a portion of the outer wall 194 extending from the bottom end 96 of each support leg 54 may be configured to be inserted between the first and second pivot arms 204, 206 such that the first pivot arm 204 is received within the "U-shaped" channel defined by the support leg 54 and extends adjacent to and/or contacts the inner surface of the outer wall 194.

Moreover, the second pivot arm 206 may include a raised portion 210 configured to act as a mechanical stop for the bottom end 96 of each support leg 54. Specifically, as will be described below, when a support leg 54 is received between the first and second pivot arms 204, 206, the bottom end 96 of the support leg 54 may abut against or otherwise contact the raised portion 210 of the second pivot arm 206. In addition, the second pivot arm 206 may also include a roller 212 positioned outwardly from the raised portion 210 such that the roller 212 extends adjacent to and/or contacts the outer surface of the outer wall 194 of the support leg 54 when the bottom end 96 is engaged against the raised portion 210.

Additionally, as shown in FIG. 18, the upend device 200 may also include a pivot stop arm 214 extending outwardly from the pivot tube 202 in a direction generally perpendicular to the first and second pivot arms 204, 206. The pivot stop arm 214 may generally be configured to stop the upend device 200 and the support leg 54 from being over rotated as the support leg 54 is being pivoted relative to the ground. Specifically, the pivot stop arm 214 may be configured to contact the ground once the support leg 54 has been rotated to a substantially vertical position, thereby preventing further rotation of the support leg 54 relative to the ground.

Figure 19:
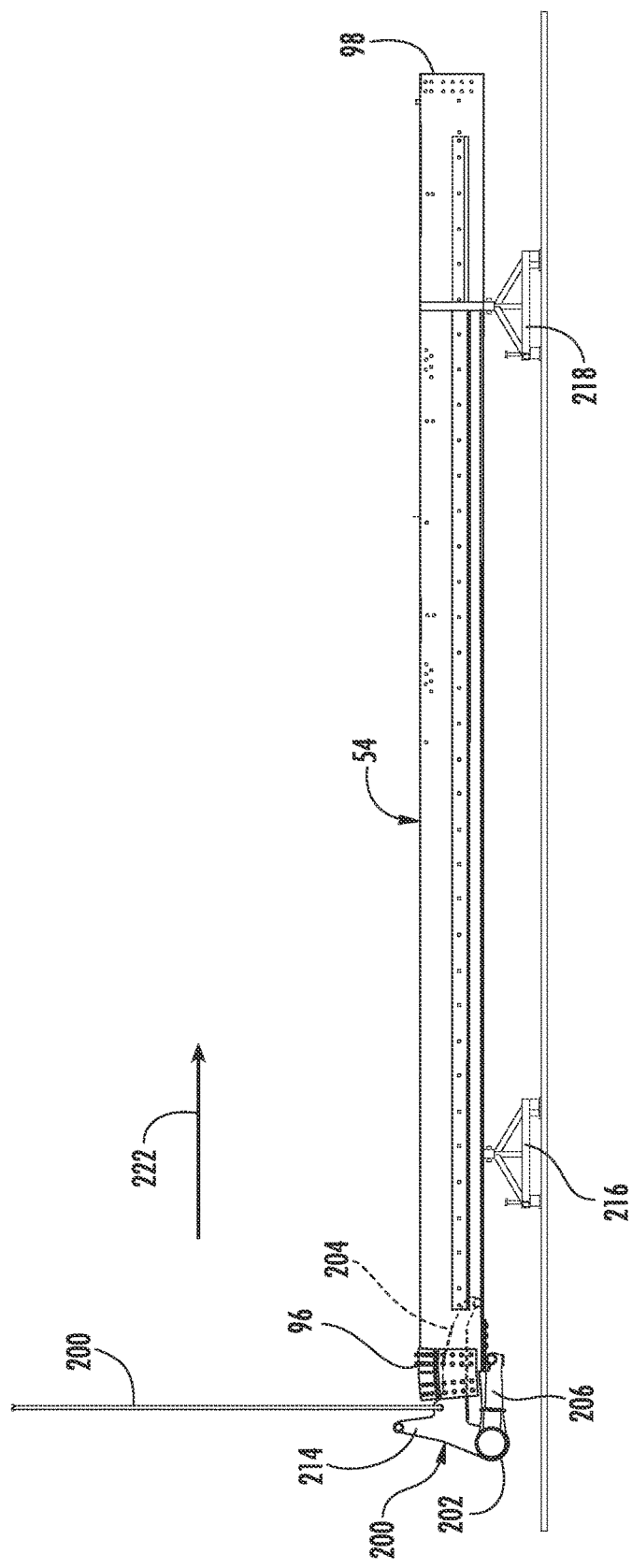
FIG. 19 illustrates a side view of a support leg with the upend device shown in FIG. 18 installed relative to the bottom end of the support leg.

One embodiment of a method for using the upend device 200 to upend a support leg 54 will now be described below with reference FIGS. 19-21. As shown in FIG. 19, the support leg 54 may be initially supported above the ground on first and second support stands 216, 218. The upend device 200 may then be installed onto the bottom end 96 of the support leg 54. For instance, as shown in FIG. 19, the upend device 200 may be lifted (e.g., via a crane cable 220) into position adjacent to the bottom end 96 of the support leg 54 and then moved lengthwise (e.g., as indicated arrow 222) relative to the support leg 54 such that the bottom end 96 is received between the first and second pivot arms 204, 206. Specifically, as shown in FIG. 21, the upend device 200 may be moved relative to the support leg 54 until the bottom end 96 of the support leg 54 contacts the raised portion 210 of the second pivot arm 206.

Thereafter, both the bottom end 96 of the support leg 54 and the upend device 200 may be lifted slightly (e.g., via the crane cable 220) to allow the support stand adjacent to the bottom end 96 (e.g., the first support stand 216) to be removed. The support leg 54 may then be supported relative to the ground via the upend device 200 and the remaining support stand (e.g., the second support stand 218) as the crane cable 220 is removed from the upend device 200 and attached to the top end 98 of the support leg 54. The top end 98 of the support leg 54 may then be lifted slightly using the crane cable 220 to allow the remaining support stand (e.g., the second support stand 218) to be removed from the support leg 54.

Figure 20:
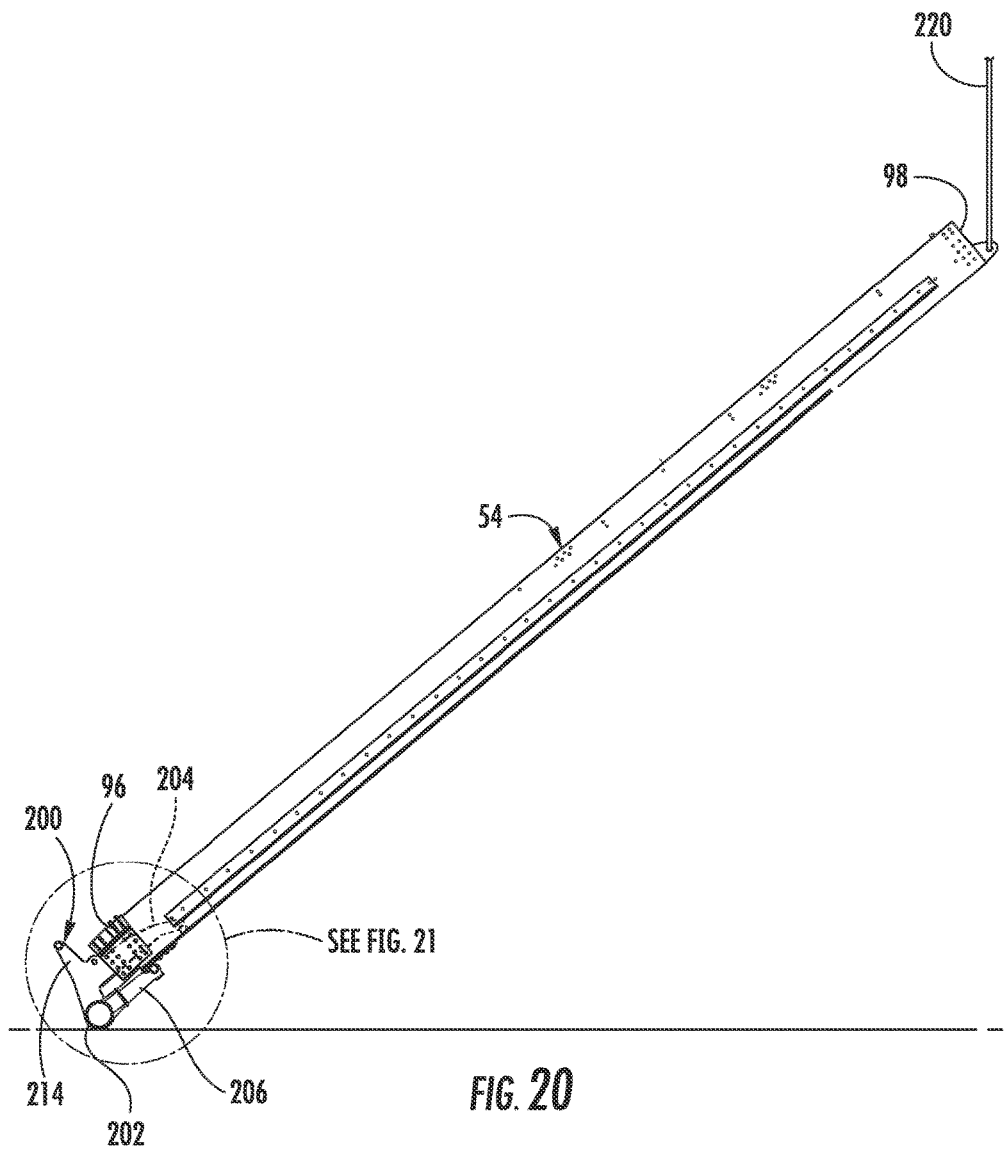
FIG. 20 illustrates another side view of the support leg and the upend device shown in FIG. 19, particularly illustrating the support leg being pivoted upwardly away from the ground about the upend device.
Figure 21:
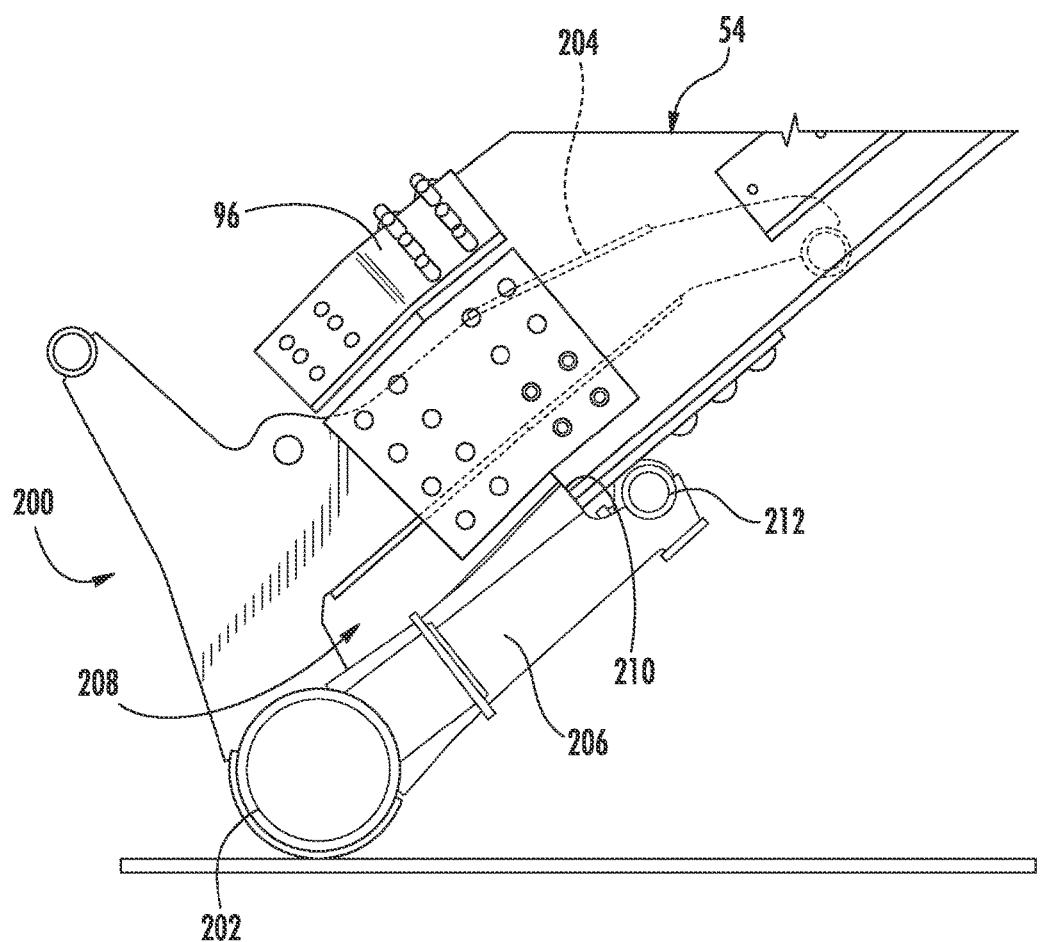
FIG. 21 illustrates a close-up view of the upend device shown in FIG. 20.

As shown in FIG. 20, after removal of the remaining support stand, the top end 98 of the support leg 54 may be lifted upward via the crane cable 220 as the bottom end 96 of the support leg 54 pivots relative to ground about the pivot tube 202. The top end 98 of the support leg 54 may then continue to be lifted upward until the support leg 54 has been pivoted to a substantially vertical position and the pivot stop arm 214 is contacting the ground. The support leg 54 may then be lifted out of the upend device 200 and transported via the crane cable 220 to the location of the tower assembly fixture 102 for subsequent attachment to one of the trolleys 120.

Figure 23:
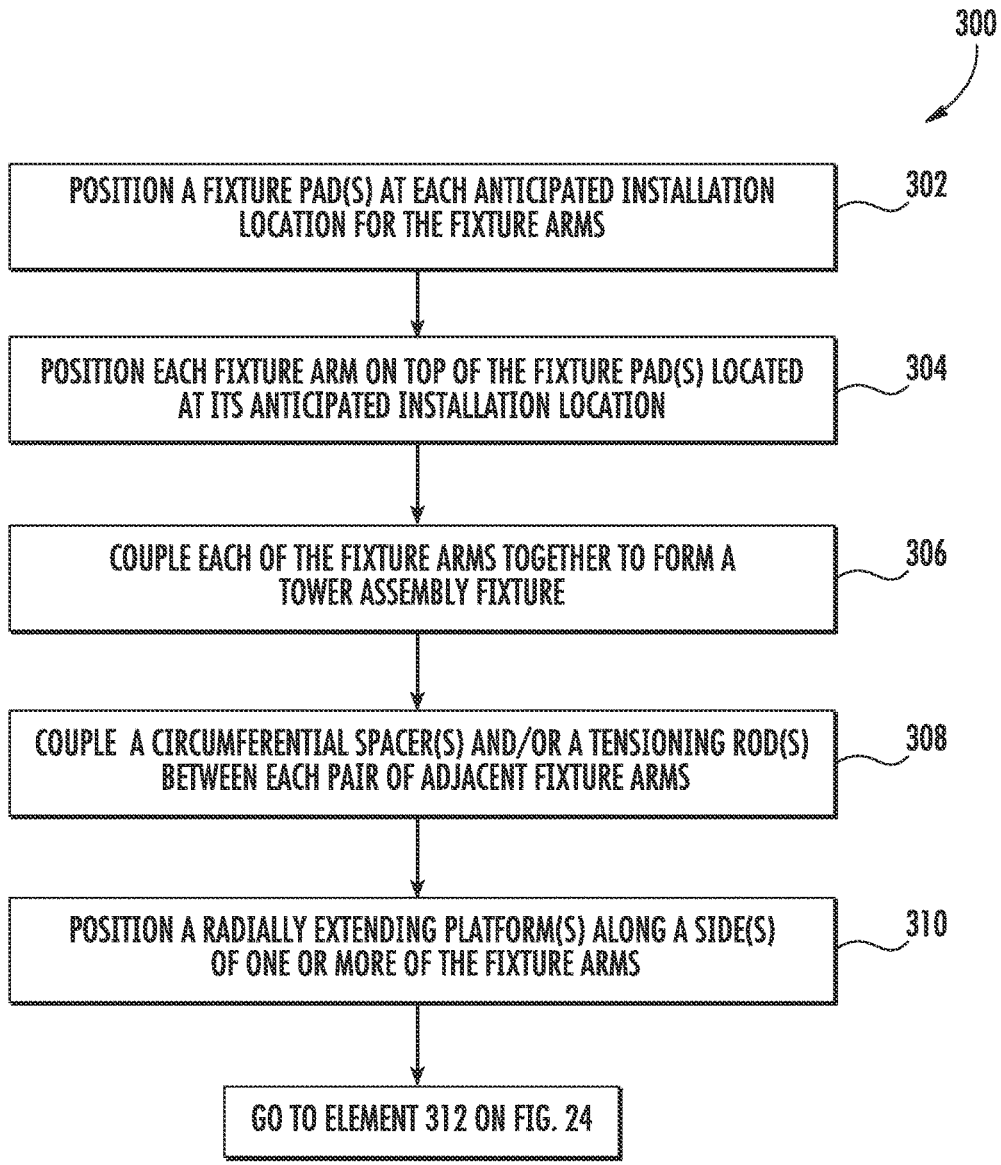
FIG. 23 illustrates a partial flow diagram of one embodiment of a method for assembling a tower section of a lattice tower structure for a wind turbine in accordance with aspects of the present subject matter.
Figure 24:
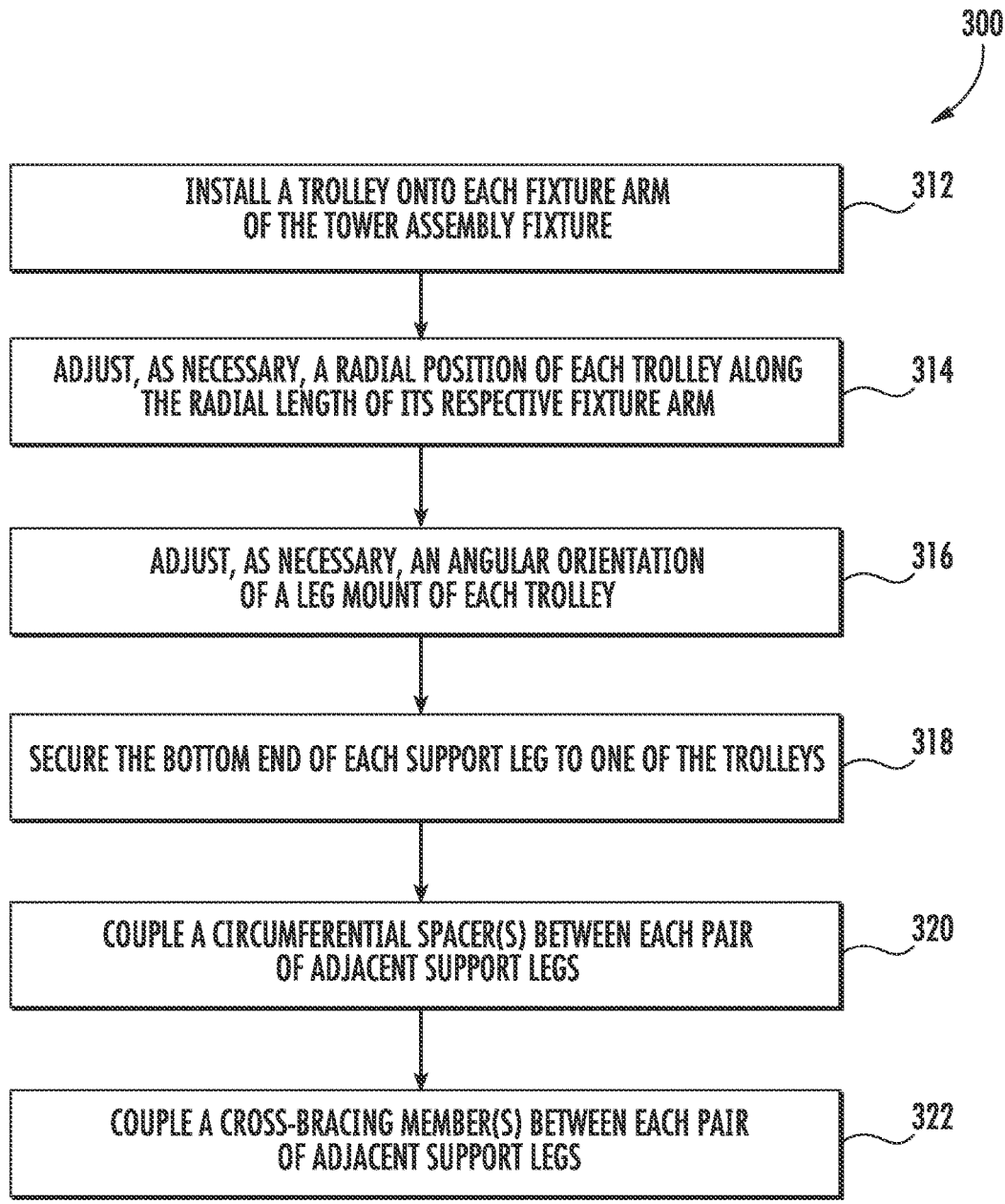
FIG. 24 illustrates a continuation of the flow diagram for the method shown in FIG. 23.

Referring now to FIGS. 23 and 24, a flow diagram of one embodiment of a method 300 for assembling a tower section of a lattice tower structure for a wind turbine is illustrated in accordance with aspects of the present subject matter. In general, the method 300 will be described herein with reference to the system 100 and related system components described above with reference to FIGS. 4-22. However, it should be appreciated by those of ordinary skill in the art that the disclosed method 300 may be implemented in accordance with any other suitable embodiment of system for assembling a tower section of a lattice tower structure. In addition, although FIGS. 23 and 24 depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 23, at (302), the method 300 may include positioning at fixture pad(s) at each anticipated installation location of the fixture arms. Specifically, as described above with reference to FIG. 4, fixture pads 122 may be installed on the ground at spaced apart locations along the anticipated radial footprint of each fixture arm 104. Thereafter, at (304), the method 300 may include positioning each fixture arm on top of the fixture pad(s) disposed at its anticipated installation location.

Additionally, at (306), the method 300 may include coupling each of the fixture arms together to form a tower assembly fixture. Specifically, as described above, the frame member 112 disposed at the first end 108 of each fixture arm 104 may be configured to be coupled to the frame members 112 of adjacent fixture arms 104 to assemble the arms 104 together. As such, the resulting tower assembly fixture 102 may include a central framed portion 106 and a plurality of fixture arms 104 extending radially outwardly from the central framed portion 106.

Moreover, at (308), the method 300 may include coupling a circumferential spacer and/or a tensioning rod between each pair of adjacent fixture arms. For instance, as described above, in one embodiment, circumferential spacers 124 may be temporarily installed between adjacent fixture arms 104 to ensure proper circumferential positioning of the arms 104 relative to one another while suitable tensioning rods 126 are being installed between the fixture arms 104. In such an embodiment, once the tensioning rods 126 have been installed, the circumferential spacers 124 may be removed from the fixture 102.

Additionally, as shown in FIG. 23, at (310), the method 300 may include positioning a radially extending platform(s) along a side(s) of one or more of the fixture arms. As indicated above, such platform(s) may provide a walking surface for service personnel working on and/or around the tower assembly fixture 102.

Referring particularly now to FIG. 24, at (312), the method 300 may include installing a trolley onto each fixture arm of the tower assembly fixture. For instance, as indicated above, the base frame 130 of each trolley 120 may be configured to be coupled to the support beam(s) 114, 116 forming each radially extending fixture arm 104.

Additionally, when installing the trolleys 120 onto the fixture arms 102, the radial positioning of each trolley 102 and/or the angular orientation of the leg mount 132 of each trolley 120 may be considered in light of the specific tower section being assembled onto the tower assembly fixture 102. Specifically, at (314), the method 300 may include adjusting, as necessary, the radial position of each trolley 120 along the radial length of its respective fixture arm 104. For instance, as indicated above, each trolley 120 may be configured to be coupled to its respective fixture arm 104 at a plurality of different radial locations so as to accommodate tower sections having differing radial dimensions. Additionally, at (316), the method 300 may include adjusting, as necessary, an angular orientation of the leg mount 132 of each trolley 120. For example, as described above, each trolley 120 may include an angle adjustment device 168 that allows the angular orientation of the leg mount 132 to be adjusted relative to the corresponding base frame 130 of the trolley 120 so as to match the angular orientation of the leg mount 132 to the desired substantially vertical orientation for the support legs 54 of the specific tower section being assembled.

Moreover, at (318), the method 300 may include securing the bottom end of each support leg to one of the trolleys. For example, as indicated above, the bottom end 96 of each support leg 54 may be configured to be coupled to the leg mount 132 of one of the trolleys 120, thereby allowing the support leg 54 to be supported above the tower assembly fixture 102 at its desired substantially vertical orientation. Thereafter, one or more secondary support members may be configured to be coupled between each pair of adjacent support legs 54. For instance, as shown in FIG. 24, at (320), the method 300 may include installing a circumferential spacer(s) between each pair of adjacent support legs. Moreover, at (322), the method 300 may include installing a cross-bracing member(s) between each pair of adjacent support legs.

In addition to the various method elements shown in FIGS. 23 and 24, the disclosed method 300 may also include any other suitable method elements consistent with disclosure provided herein. For instance, upon assembling a given tower section onto the tower assembly fixture 102, another tower section may be assembled directly on top of the previously assembled section to form a vertical tower stack. In addition, two or more trolleys 120 may be installed onto each fixture arm 104 to allow two or more nested tower sections to be assembled onto the tower assembly fixture 102. Moreover, once a given tower section (or vertical stack) has been assembled onto the tower assembly fixture 102, the tower section (or vertical stack) may then be removed from the fixture 102 and transported to the final tower location 44 for subsequent assembly within the lattice tower structure 50.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for assembling a tower section of a lattice tower structure for a wind turbine on a tower assembly fixture, the tower assembly fixture including a plurality of radially extending fixture arms, the method comprising:
    installing a first trolley onto a first fixture arm of the plurality of radially extending fixture arms, the first trolley including a first base frame configured to be coupled to the first fixture arm and a first leg mount coupled to the first base frame;
    installing a second trolley onto a second fixture arm of the plurality of radially extending fixture arms, the second trolley including a second base frame configured to be coupled to the second fixture arm and a second leg mount coupled to the second base frame;
    adjusting an angular orientation of the first leg mount relative to the first base frame;
    securing a first support leg of the tower section to the first leg mount;
    securing a second support leg of the tower section to the second leg mount; and
    coupling at least one secondary support member between the first and second support legs,
    wherein an orientation of the first support leg relative to vertical is based on the angular orientation of the first leg mount.

2. The method of claim 1, wherein installing the first trolley onto the first fixture arm comprises positioning the first trolley at a radial location defined between opposed ends of the first fixture arm that is associated with a radial dimension of the tower section being assembled on the tower assembly fixture.

3. The method of claim 2, wherein the first base frame is configured to be removably coupled to the first fixture arm at a plurality of different radial locations defined between the opposed ends.

4. The method of claim 2, wherein installing the second trolley onto the second fixture arm comprises positioning the second trolley at a radial location defined between opposed ends of the second fixture arm corresponding to the radial location of the first trolley on the first fixture arm.

5. The method of claim 1, wherein adjusting the angular orientation of the first leg mount relative to the first base frame comprises pivoting the first leg mount relative to the first base frame via an angle adjustment device coupled between the first base frame and the first leg mount.

6. The method of claim 5, wherein the angle adjustment device comprises a screw jack coupled between the first base frame and the first leg mount.

7. The method of claim 1, further comprising adjusting an orientation of the second leg mount relative to the second base frame to an angular orientation corresponding to the angular orientation of the first leg mount, wherein an orientation of the second support leg relative to vertical is based on the angular orientation of the second leg mount.

8. The method of claim 1, wherein coupling the at least one secondary support member between the first and seconds support legs comprises coupling a circumferential spacer between the first and second support legs.

9. The method of claim 1, wherein coupling the at least one secondary support member between the first and seconds support legs comprises coupling at least one cross-bracing member between the first and second support legs.

10. The method of claim 1, wherein the first support leg extends between a bottom end configured to be coupled to the first leg mount and an opposite top end, the method further comprising coupling a support leg of a second tower section to the top end of the first support leg while the first support leg is coupled to the first leg mount of the first trolley.

11. The method of claim 1, further comprising:
  installing a third trolley onto the first fixture arm at a location radially inwardly or radially outwardly from the first trolley; and
  coupling a support leg of a second tower section to the third trolley.

12. A method for assembling tower sections of a lattice tower structure for a wind turbine on a tower assembly fixture, the tower assembly fixture including a plurality of radially extending fixture arms, the method comprising:
  installing a plurality of trolleys onto the tower assembly fixture, each trolley being installed onto a respective one of the plurality of radially extending fixture arms; each trolley including a base frame configured to be coupled to its respective fixture arm and a leg mount coupled to the base frame;
  securing each of a plurality of support legs of a tower section of the lattice tower structure to a respective one of the plurality of trolleys, the tower section corresponding to a first tower section of the lattice tower structure;
  coupling at least one secondary support member between each pair of adjacent support legs to form the tower section; and
  assembling a second tower section of the lattice tower structure on top of the first tower section while the plurality of support legs of the first tower section are secured to the plurality of trolleys.

13. The method of claim 12, wherein the plurality of trolleys corresponds to a first plurality of trolleys, the method further comprising:
  installing a second plurality of trolleys onto the tower assembly fixture, each of the second plurality of trolleys being installed onto a respective one of the plurality of radially extending fixture arms at a location radially inwardly or radially outwardly from each of the first plurality of trolleys; and
  securing each of a plurality of support legs of a third tower section of the lattice tower structure to a respective one of the second plurality of trolleys.

14. The method of claim 12, further comprising adjusting an angular orientation of each leg mount relative to its corresponding base frame.

15. The method of claim 14, wherein adjusting the angular orientation of each leg mount relative to its corresponding base frame comprises pivoting each leg mount relative to its corresponding base frame via an angle adjustment device coupled between each leg mount relative and its corresponding base frame.

16. A method for assembling a tower section of a lattice tower structure for a wind turbine on a tower assembly fixture, the tower assembly fixture including a plurality of radially extending fixture arms, the method comprising:
  installing a first trolley onto a first fixture arm of the plurality of radially extending fixture arms, the first trolley including a first base frame configured to be coupled to the first fixture arm and a first leg mount coupled to the first base frame;
  installing a second trolley onto a second fixture arm of the plurality of radially extending fixture arms, the second trolley including a second base frame configured to be coupled to the second fixture arm and a second leg mount coupled to the second base frame;
  securing a first support leg of the tower section to the first leg mount;
  securing a second support leg of the tower section to the second leg mount;
  installing a third trolley onto the first fixture arm at a location radially inwardly or radially outwardly from the first trolley; and
  coupling a support leg of a second tower section to the third trolley.

17. The method of claim 16, further comprising adjusting an angular orientation of the first leg mount relative to the first base frame, wherein an orientation of the first support leg relative to vertical is based on the angular orientation of the first leg mount.

18. The method of claim 17, wherein adjusting the angular orientation of the first leg mount relative to the first base frame comprises pivoting the first leg mount relative to the first base frame via an angle adjustment device coupled between the first base frame and the first leg mount.

19. The method of claim 16, wherein the first support leg extends between a bottom end configured to be coupled to the first leg mount and an opposite top end, the method further comprising coupling a support leg of a second tower section to the top end of the first support leg while the first support leg is coupled to the first leg mount of the first trolley.

* * * * *